US012801707B2

(12) United States Patent
Kaneko et al.

(10) Patent No.: US 12,801,707 B2
(45) Date of Patent: Nov. 17, 2026

(54) ELECTRONIC DEVICE AND CONTROL METHOD FOR ELECTRONIC DEVICE

(71) Applicant: Panasonic Intellectual Property Management Co., Ltd., Osaka (JP)

(72) Inventors: Yoshihiro Kaneko, Osaka (JP); Takuto Naito, Kanagawa (JP); Misako Moribe, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 94 days.

(21) Appl. No.: 19/058,217

(22) Filed: Feb. 20, 2025

(65) Prior Publication Data

US 2025/0190528 A1 Jun. 12, 2025

Related U.S. Application Data

(63) Continuation of application No. PCT/JP2023/029033, filed on Aug. 9, 2023.

(30) Foreign Application Priority Data

Sep. 1, 2022 (JP) ................................ 2022-139409

(51) Int. Cl.
*G06F 21/31* (2013.01)
*G06F 21/45* (2013.01)
(Continued)

(52) U.S. Cl.
CPC ...... *G06F 21/31* (2013.01); *G06F 2221/2111* (2013.01)

(58) Field of Classification Search
CPC .. G06F 21/31; G06F 2221/2111; G06F 21/60; G06F 21/45; G06F 21/88
See application file for complete search history.

(56) References Cited

U.S. PATENT DOCUMENTS 1,027,074 A 5/1912 Sessions
9,218,471 B2 12/2015 Horiuchi et al.
(Continued)

FOREIGN PATENT DOCUMENTS

JP 2003-099400 A 4/2003
JP 2012-234531 A 11/2012
(Continued)

OTHER PUBLICATIONS

International Search Report for related International Patent Application PCT/JP2023/029033 mailed Oct. 24, 2023.

*Primary Examiner* — Darren B Schwartz
(74) *Attorney, Agent, or Firm* — RENNER, OTTO, BOISSELLE, & SKLAR

(57) ABSTRACT

An electronic device according to the present disclosure includes: a processor; and a storage that stores an instruction to be executed by the processor on a basic input output system (BIOS) or a unified extensible firmware interface (UEFI), and the instruction includes: acquiring position information indicating a position of an electronic device; acquiring security setting information indicating a security setting determined according to the position of the electronic device; determining a security level based on the position of the electronic device by using the position information and the security setting information; and determining an authentication method that enables use of the electronic device according to the security level.

16 Claims, 13 Drawing Sheets

(51) Int. Cl.
*G06F 21/60* (2013.01)
*G06F 21/88* (2013.01)

(56) References Cited

U.S. PATENT DOCUMENTS

| | | | | |
|---|---|---|---|---|
| 9,280,645 | B1* | 3/2016 | Alikhani | G06F 21/31 |
| 10,776,464 | B2* | 9/2020 | Wilson | H04L 9/0841 |
| 2003/0061166 | A1 | 3/2003 | Saito et al. | |
| 2012/0084853 | A1* | 4/2012 | Wada | G06F 21/34 726/16 |
| 2012/0239950 | A1* | 9/2012 | Davis | H04W 12/06 713/320 |
| 2012/0317651 | A1 | 12/2012 | Saito | |
| 2013/0167224 | A1 | 6/2013 | Horiuchi et al. | |
| 2016/0180069 | A1* | 6/2016 | Gandhi | G06F 21/32 726/19 |
| 2018/0322269 | A1* | 11/2018 | Arora | G06F 21/33 |
| 2019/0089831 | A1* | 3/2019 | Medlen | G10L 15/26 |
| 2019/0164156 | A1 | 5/2019 | Lindemann | |
| 2019/0286824 | A1* | 9/2019 | Aizawa | G06F 21/44 |
| 2020/0162914 | A1* | 5/2020 | Chun | H04W 4/48 |
| 2021/0192027 | A1* | 6/2021 | Malton | G06F 21/31 |
| 2022/0391545 | A1* | 12/2022 | Stewart | G06F 21/31 |
| 2023/0342490 | A1 | 10/2023 | Funakou et al. | |
| 2023/0342503 | A1* | 10/2023 | Zhao | G06F 21/74 |

FOREIGN PATENT DOCUMENTS

| | | | |
|---|---|---|---|
| JP | 2013-131164 | A | 7/2013 |
| JP | 2014-503909 | A | 2/2014 |
| JP | 2016-076274 | A | 5/2016 |
| JP | 2016-521403 | A | 7/2016 |
| JP | 2016-218817 | A | 12/2016 |
| JP | 2019-152024 | A | 9/2019 |
| JP | 2019-160210 | A | 9/2019 |
| JP | 2021-504860 | A | 2/2021 |
| WO | 2012/087853 | A2 | 6/2012 |
| WO | 2014153462 | A2 | 9/2014 |
| WO | 2019104323 | A1 | 5/2019 |
| WO | 2022/013952 | A1 | 1/2022 |

* cited by examiner

ELECTRONIC DEVICE AND CONTROL METHOD FOR ELECTRONIC DEVICE

TECHNICAL FIELD

The present disclosure relates to an electronic device and a method for controlling an electronic device.

BACKGROUND ART

PTL 1 discloses an information processing apparatus having a lock function of restricting a user's operation.

The information processing apparatus described in PTL 1 includes a lock set unit, an unlock unit, and a change unit. In a case where the user's operation is not input for a predetermined period or more, the lock set unit causes the information processing apparatus to transition to the locked state. The unlock unit releases the locked state in response to the input of the preset first password. The change unit changes the number of input characters of the first password for releasing the locked state according to the usage status of the information processing apparatus.

CITATION LIST

Patent Literature

PTL 1: Unexamined Japanese Patent Publication No. 2013-131164

SUMMARY OF THE INVENTION

Technical Problem

The apparatus described in PTL 1 still has room for improvement in terms of improving security.

The present disclosure provides an electronic device and a method for controlling the electronic device that can improve security.

Solution to Problem

An electronic device according to one aspect of the present disclosure includes:

- a processor; and
- a storage that stores an instruction to be executed by the processor on a basic input output system (BIOS) or a unified extensible firmware interface (UEFI),
- in which the instruction includes:
  - acquiring position information indicating a position of an electronic device;
  - acquiring security setting information indicating a security setting determined according to the position of the electronic device;
  - determining a security level based on the position of the electronic device by using the position information and the security setting information; and
  - determining an authentication method that enables use of the electronic device according to the security level.

A method for controlling an electronic device according to one aspect of the present disclosure is

- the method for controlling the electronic device to be executed on a basic input output system (BIOS) or a unified extensible firmware interface (UEFI), the method includes:
  - acquiring position information indicating a position of the electronic device;
  - acquiring security setting information indicating a security setting determined according to the position of the electronic device;
  - determining a security level based on the position of the electronic device by using the position information and the security setting information; and
  - determining an authentication method that enables use of the electronic device according to the security level.

Advantageous Effect of Invention

According to the present disclosure, it is possible to provide an electronic device and a method for controlling the electronic device capable of improving security.

DESCRIPTION OF EMBODIMENT

Background to Present Disclosure

For example, in an electronic device, a password of a basic input output system (BIOS) is set, and a user is requested to input the password when the electronic device is started, thereby taking security measures.

In recent years, the number of users who work using an electronic device such as a laptop PC or a tablet PC at a place other than the office, for example, at home or at a client's place, for example, due to telework or a business trip has increased. For this reason, in the authentication using a password of the BIOS, it may be difficult to ensure security.

In order to improve security, it is considered to change an authentication method that enables use of an electronic device to a method with higher security. However, when the authentication method of the electronic device is changed to a method with higher security, the authentication becomes complicated and the user's trouble increases, so that convenience is deteriorated. For example, security is relatively ensured in a place such as a workplace, and an authentication method with higher security is not required. For this reason, when a complicated authentication method with high security is adopted, for a user who uses an electronic device in a place where security is ensured, usability is poor.

Therefore, as a result of intensive studies, the present inventors have developed an electronic device that determines an authentication method according to a position where the electronic device is used, and have reached the present disclosure.

One exemplary embodiment of the present disclosure will now be described with reference to the accompanying drawings. Note that, the following description is merely exemplary in nature, and is not intended to limit the scope of, applications of, or use of the present disclosure. Moreover, the drawings are schematic representations, and the ratios between dimensions or the like do not necessarily match the actual dimensions.

Note that, the terms "first", "second", and the like used herein are only for the purpose of description, and should not be understood as explicitly or implicitly indicating relative importance or a priority of technical features. Features limited to "first" and "second" are intended to explicitly or implicitly indicate the inclusion of one or more such features.

First Exemplary Embodiment

[General Configuration]

Figure 1:
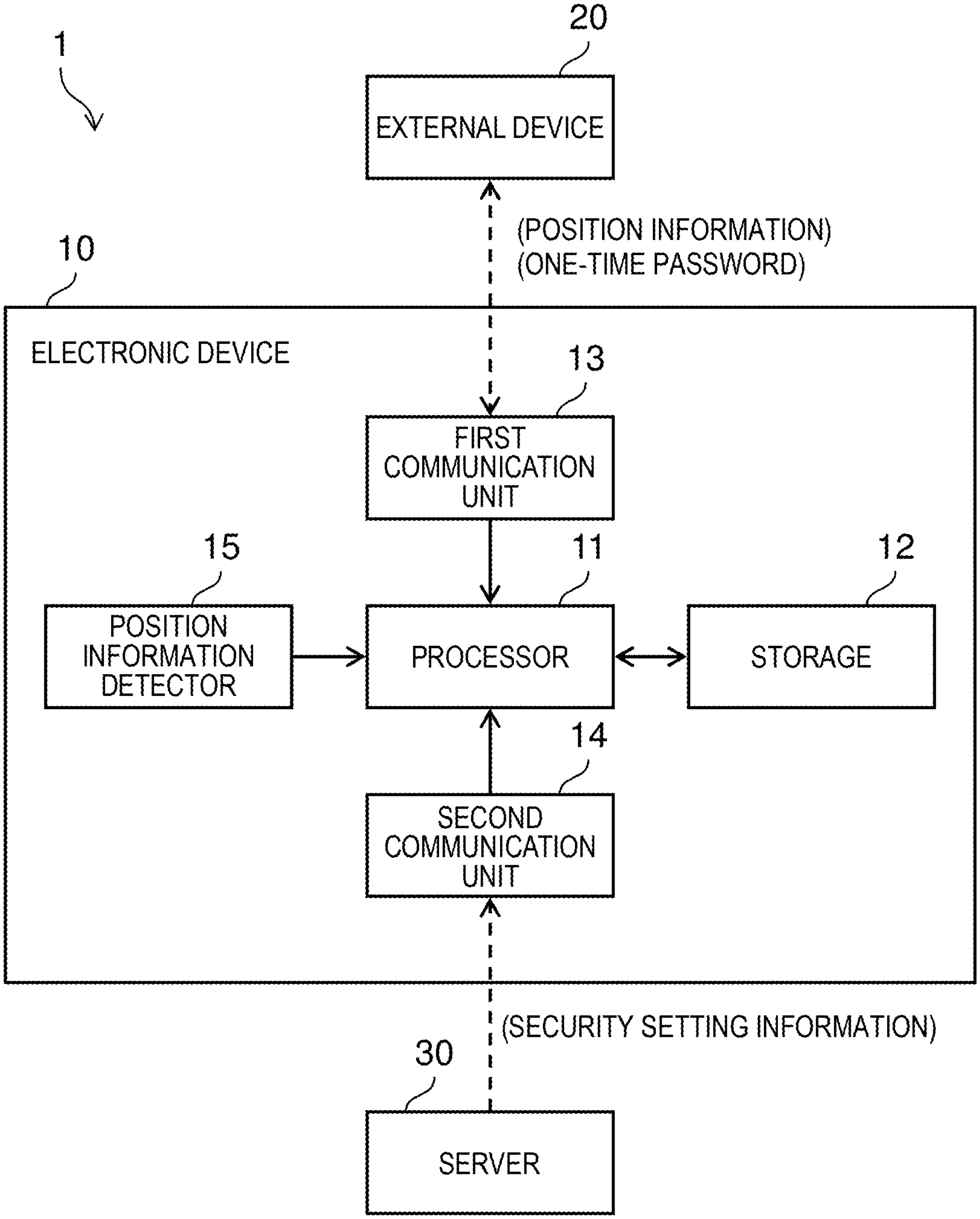
FIG. 1 is a schematic block diagram illustrating an example of a configuration of a control system including an electronic device according to a first exemplary embodiment of the present disclosure.

FIG. 1 is a schematic block diagram illustrating a configuration of control system 1 including electronic device 10 according to a first exemplary embodiment of the present disclosure. As illustrated in FIG. 1, in control system 1, electronic device 10 and external device 20 perform near field communication. In addition, electronic device 10 and server 30 communicate with each other via a network.

<Electronic Device>

Electronic device 10 is, for example, a laptop PC. Electronic device 10 includes processor 11, storage 12, first communication unit 13, second communication unit 14, and position information detector 15.

Processor 11 controls each component of electronic device 10. Processor 11 reads data, an instruction, or a program stored in storage 12 and performs various arithmetic processing to implement a predetermined function. For example, processor 11 can be implemented by a circuit including a semiconductor element and the like. Processor 11 can be formed of, for example, a microcomputer, a CPU, an MPU, a GPU, a DSP, an FPGA, and an ASIC. In the present exemplary embodiment, processor 11 executes an instruction on the BIOS. For example, before an operation system (OS) such as Windows (registered trademark) or Linux (registered trademark) is activated, processor 11 executes an instruction on the BIOS.

Storage 12 stores the instruction executed by processor 11 on the BIOS. Storage 12 is a storage medium that stores a command, a program, or data necessary for implementing a function of electronic device 10. Storage 12 can be implemented by, for example, RAM, ROM, PROM, PROM, EPROM, flash memory, HDD, SSD, or a combination thereof. In the present exemplary embodiment, storage 12 stores the BIOS.

First communication unit 13 performs near field communication with external device 20. The near field communication means, for example, wireless communication within several meters. For example, the near field communication may be wireless communication within 50 m, preferably wireless communication within 10 m, and more preferably wireless communication within 5 m. First communication unit 13 includes a circuit that performs near field communication with external device 20 in conformity with a predetermined communication standard. The predetermined communication standard includes, for example, Bluetooth (registered trademark).

Second communication unit 14 communicates with server 30 via the network. Second communication unit 14 includes a circuit that communicates with server 30 via a wireless or wired network in conformity with a predetermined communication standard. For example, electronic device 10 includes a circuit that can perform communication in conformity with a standard such as a local area network (LAN), a wide area network (WAN), Wi-Fi (registered trademark), a wireless wide area network (WWAN), or a wireless local area network (WLAN).

Position information detector 15 detects the position of electronic device 10. Position information detector 15 includes, for example, a global positioning system (GPS). Position information includes, for example, latitude and longitude.

<External Device>

External device 20 performs near field communication with electronic device 10. External device 20 may be, for example, a mobile terminal that can be carried by a user, such as a smartphone or a tablet PC. Alternatively, external device 20 may be an information processing apparatus installed at a predetermined place.

For example, external device 20 includes a processor and a storage that stores a program executed by the processor. In external device 20, the processor controls each component of external device 20. The processor reads data, an instruction, or a program stored in the storage and performs various arithmetic processing to implement a predetermined function. For example, in external device 20, the processor can be implemented by a circuit including a semiconductor element and the like. The processor can be formed of, for example, a microcomputer, a CPU, an MPU, a GPU, a DSP, an FPGA, and an ASIC. The storage can be implemented by, for example, RAM, ROM, PROM, PROM, EPROM, flash memory, HDD, SSD, or a combination thereof.

External device 20 includes a communication circuit that performs near field communication with electronic device 10 in conformity with a predetermined communication standard. In addition, external device 20 includes a sensor that detects the position of external device 20. The sensor is, for example, the GPS. In the present exemplary embodiment, the sensor of external device 20 can detect the position with higher accuracy than position information detector 15 of electronic device 10.

External device 20 transmits the position information acquired by external device 20 to electronic device 10 by performing near field communication with electronic device 10. In addition, external device 20 receives a one-time password to be described later from electronic device 10.

<Server>

Server 30 communicates with electronic device 10 via the network. Server 30 is an information processing apparatus connectable to the network.

For example, server 30 includes the processor and the storage that stores a program executed by the processor. In server 30, the processor controls each component of server 30. The processor reads data, an instruction, or a program stored in the storage and performs various arithmetic processing to implement a predetermined function. For example, in server 30, the processor can be implemented by a circuit including a semiconductor element and the like. The processor can be formed of, for example, a microcomputer, a CPU, an MPU, a GPU, a DSP, an FPGA, and an ASIC. The storage can be implemented by, for example, RAM, ROM, PROM, PROM, EPROM, flash memory, HDD, SSD, or a combination thereof.

Server 30 stores security setting information indicating security setting determined according to the position of electronic device 10 in the storage.

The security setting information includes information for determining the security level according to the position. In the present exemplary embodiment, the security level is a level indicating a level of security required for authentication that enables use of electronic device 10. That is, the security level is a level indicating the level of security that is a reference when an authentication method of the electronic device 10 is determined. For example, a higher security level indicates that the position where electronic device 10 is used is not secure, and electronic device 10 requests authentication in an authentication method with relatively high security.

For example, the authentication method includes authentication using a password of the BIOS, authentication using a one-time password valid only once, or authentication using a fingerprint. In these authentication methods, the security level increases in proportion to the order of authentication using a password of the BIOS, authentication using a one-time password valid only once, and authentication using a fingerprint.

For example, the security setting information includes a registered position indicating a position registered in advance, a first security level set for the registered position, and a second security level set for an unregistered position other than the registered position. For example, the first security level is set to be lower than the second security level. For example, the security setting information may be a table indicating the position and the security level corresponding to the position.

For example, in the security setting information, in a case where a position where security is ensured is registered as a registered position, the first security level having a relatively low security level is set for the registered position. On the other hand, the second security level having a relatively high security level is set for the unregistered position.

The registered position is, for example, a place where security can be ensured, such as a workplace or a co-working space. The unregistered position is a place where security cannot be ensured, and is, for example, a place other than a workplace and a co-working space.

The security setting information can be set, changed, or updated, for example, by an administrator of server 30.

Server 30 includes a circuit that communicates with electronic device 10 via a wireless or wired network in conformity with a predetermined communication standard. Server 30 transmits the security setting information stored in the storage to electronic device 10.

[Operation]

An operation of electronic device 10, that is, an example of a method for controlling electronic device 10 will be described with reference to FIG. 2 to FIG. 6.

Figure 2:
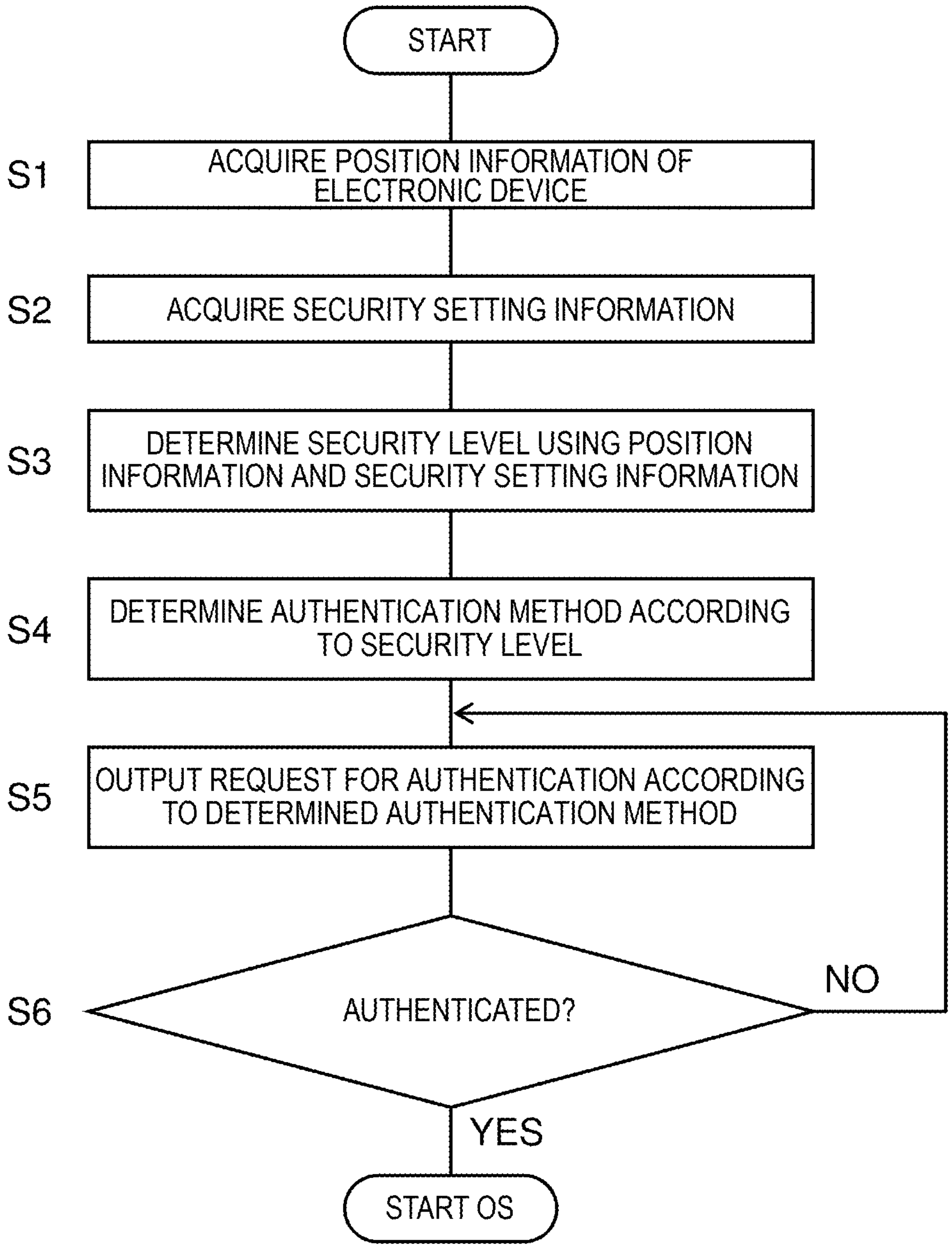
FIG. 2 is a control flowchart of an example of a method for controlling an electronic device according to the first exemplary embodiment of the present disclosure.
Figure 3:
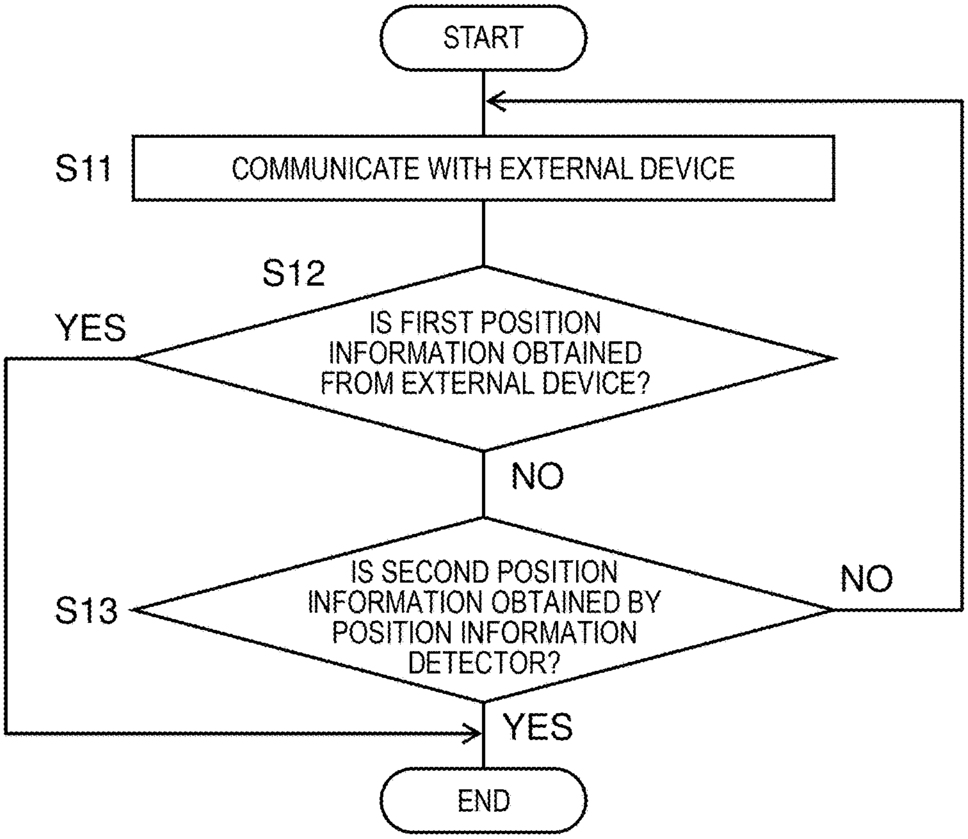
FIG. 3 is a flowchart of an example of processing of acquiring position information of an electronic device.
Figure 4:
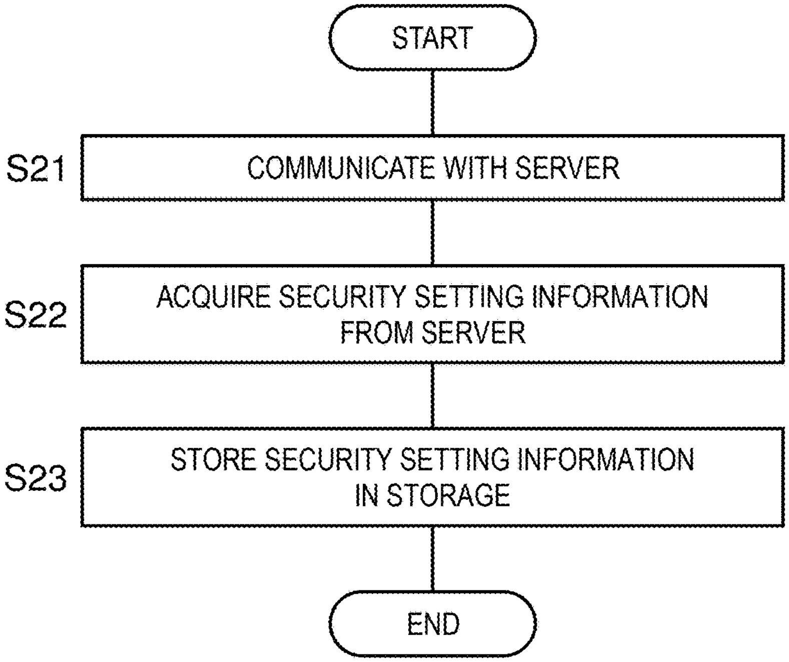
FIG. 4 is a flowchart of an example of processing of acquiring security setting information.
Figure 5:
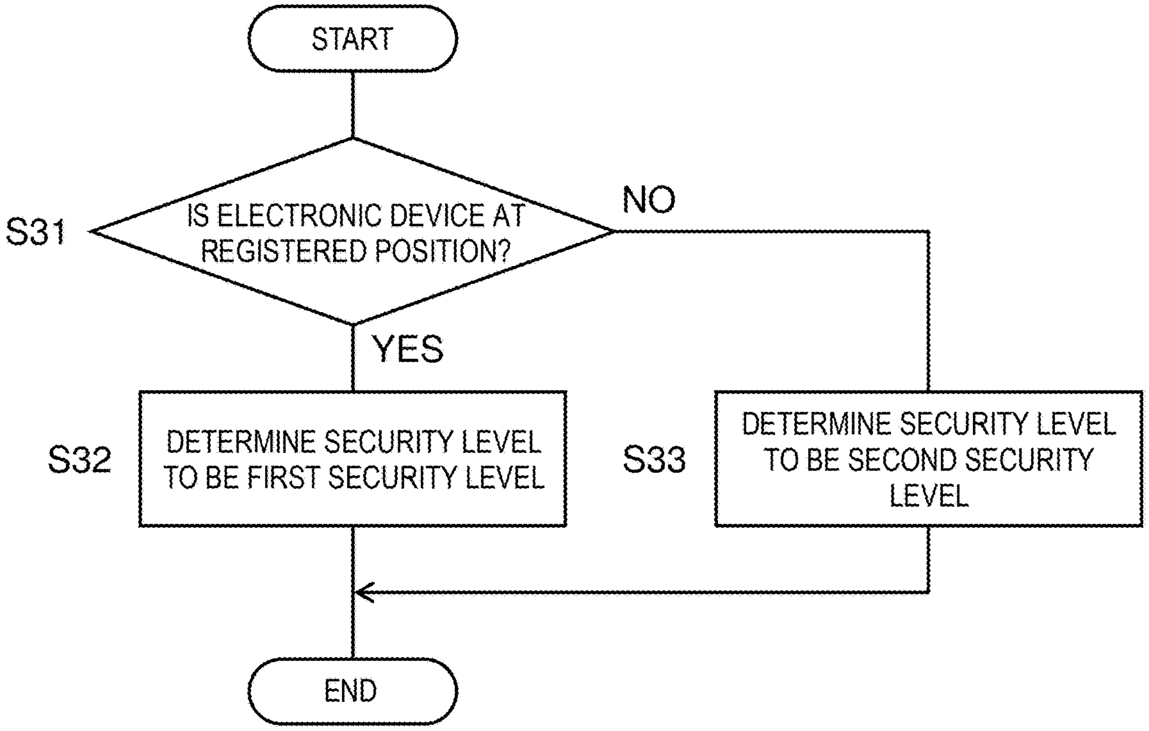
FIG. 5 is a flowchart of an example of processing of determining a security level.
Figure 6:
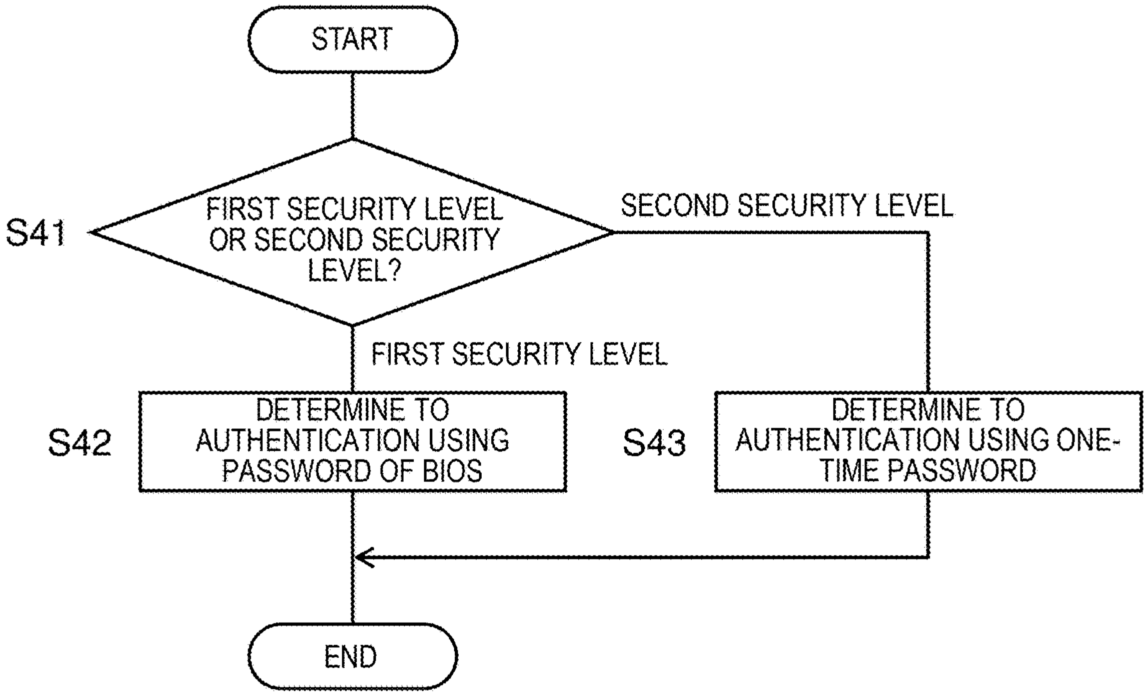
FIG. 6 is a flowchart of an example of processing of determining an authentication method.

FIG. 2 illustrates a control flowchart of an example of a method for controlling electronic device 10 according to the first exemplary embodiment of the present disclosure. FIG. 3 illustrates a flowchart of an example of processing of acquiring position information of electronic device 10. FIG. 4 illustrates a flowchart of an example of processing of acquiring security setting information. FIG. 5 illustrates a flowchart of an example of processing of determining a security level. FIG. 6 illustrates a flowchart of an example of processing of determining an authentication method.

As illustrated in FIG. 2, in step S1, electronic device 10 acquires the position information of electronic device 10. As illustrated in FIG. 3, step S1 includes steps S11 to S13.

In step S11, electronic device 10 communicates with external device 20. Electronic device 10 acquires the position information acquired by external device 20 by performing near field communication with external device 20. In the present specification, the position information acquired by external device 20 is referred to as "first position information".

Specifically, external device 20 acquires the first position information by the sensor of external device 20. External device 20 transmits the first position information to electronic device 10. Electronic device 10 receives the first position information from external device 20 by first communication unit 13.

In step S12, electronic device 10 determines whether or not the first position information is acquired from external device 20.

In a case where it is determined in step S12 that electronic device 10 has acquired the first position information, the processing of acquiring the position information ends. In this case, electronic device 10 determines that the position indicated by the first position information is the position where electronic device 10 is used.

In a case where it is determined in step S12 that electronic device 10 has not acquired the first position information, the processing proceeds to step S13. For example, in a case where electronic device 10 cannot communicate with external device 20 or can communicate with external device 20 but cannot receive the first position information, it is determined that the first position information is not acquired from external device 20.

Note that, in step S12, in a case where electronic device 10 has not been able to acquire the first position information for a predetermined period, the processing may proceed to step S13. Alternatively, in a case where electronic device 10 has not been able to acquire the first position information a predetermined number of times, the processing may proceed to step S13.

In step S13, electronic device 10 determines whether or not the position information of electronic device 10 has been acquired using position information detector 15 of electronic device 10. In the present specification, the position information acquired by position information detector 15 of electronic device 10 is referred to as "second position information".

In a case where it is determined in step S13 that electronic device 10 has acquired the second position information using position information detector 15, the processing of acquiring the position information ends. In this case, electronic device 10 determines that the position indicated by the second position information is the position where electronic device 10 is used.

In a case where it is determined in step 13 that electronic device 10 has not acquired the second position information using position information detector 15, the processing returns to step S11.

As described above, in step S1, electronic device 10 acquires the position information indicating the position of electronic device 10 by performing steps S11 to S13.

Returning to FIG. 2, in step S2, electronic device 10 acquires the security setting information. The security setting information is information indicating the security setting determined according to the position of electronic device 10. In the present exemplary embodiment, the security setting information includes a registered position indicating a position registered in advance, the first security level set for the registered position, and the second security level set for a position other than the registered position. The first security level is set to be lower than the second security level.

Electronic device 10 stores the security setting information in storage 12. Therefore, in step S2, electronic device 10 may acquire the security setting information by reading the security setting information from storage 12.

The security setting information is set, changed, or updated by the administrator. Electronic device 10 can set, change, or update the security setting information stored in storage 12 of electronic device 10 by acquiring the latest security setting information from server 30.

Processing of setting, changing, or updating the security setting information stored in storage 12 of electronic device 10 will be described with reference to FIG. 4.

As illustrated in FIG. 4, in step S21, electronic device 10 communicates with server 30. Electronic device 10 communicates with server 30 via the network by second communication unit 14.

In step S22, electronic device 10 acquires the security setting information from server 30. Server 30 stores the security setting information set, changed, or updated by the administrator in the storage. Server 30 transmits the security setting information to electronic device 10 via the network. Electronic device 10 receives the security setting information from server 30 via the network by second communication unit 14.

In step S23, electronic device 10 stores the security setting information in storage 12.

As described above, by performing steps S21 to S23, electronic device 10 can acquire the latest security setting information and store the acquired security setting information in storage 12. Note that, steps S21 to S23 may be automatically performed at a predetermined time, or may be performed by a user's operation.

Returning to FIG. 2, in step S3, electronic device 10 determines the security level based on the position of electronic device 10 using the position information and the security setting information of electronic device 10. As illustrated in FIG. 5, step S3 includes steps S31 to S32.

In step S31, it is determined whether or not electronic device 10 is at the registered position. Electronic device 10 determines whether or not electronic device 10 is at the registered position using the position information of electronic device 10 acquired in step S1 and the security setting information acquired in step S2.

Specifically, electronic device 10 determines whether or not the position indicated by the position information of electronic device 10 acquired in step S1 is at the registered position registered in the security setting information. For example, electronic device 10 compares the position indicated by the position information with the registered position included in the security setting information. In a case where the position indicated by the position information matches the registered position, or in a case where the position indicated by the position information is within a predetermined range from the registered position, it is determined that electronic device 10 is at the registered position. The predetermined range can be arbitrarily set. For example, the predetermined range may be set in a facility, a land, or a place indicated by the registered position, or may be set in a room, a land, or a part of a place in the facility.

In a case where it is determined in step S31 that electronic device 10 is at the registered position, the processing proceeds to step S32. In a case where it is determined that electronic device 10 is not at the registered position, that is, electronic device 10 is at the unregistered position, the processing proceeds to step S33.

In step S32, electronic device 10 determines the security level to be the first security level. Electronic device 10 sets the first security level set for the registered position determined in step S31 to the security level based on the security setting information.

In the present exemplary embodiment, since the registered position is a workplace or the like in which security is ensured, the first security level having a relatively low security level is set for the registered position.

In step S33, electronic device 10 determines the security level to be the second security level. Electronic device 10 sets the second security level set for the unregistered position determined in step S31 as the security level based on the security setting information.

In the present exemplary embodiment, since the unregistered position is a place other than a workplace where security is not ensured, the second security level having a relatively high security level is set for the unregistered position.

As described above, in step S3, by performing steps S31 to S33, electronic device 10 determines the security level based on the position of electronic device 10.

Returning to FIG. 2, in step S4, electronic device 10 determines an authentication method according to the security level. Electronic device 10 determines the authentication method according to the security level determined in step S3.

For example, electronic device 10 stores, in storage 12, authentication method information including the security level and the authentication method set for the security level. The authentication method information may be a table indicating the security level and the authentication method corresponding to the security level. The authentication method information can be set, changed, or updated by an administrator. The authentication method information stored in storage 12 can be acquired from server 30 and set, changed, or updated similarly to the security setting information. Note that, the authentication method information may be included in the security setting information.

For example, the authentication method includes authentication using a password of the BIOS, authentication using a one-time password valid only once, or authentication using a fingerprint according to the security level. In the present exemplary embodiment, authentication using a password of the BIOS is set for the first security level having a relatively low security level, and authentication using a one-time password valid only once is set for the second security level having a relatively high security level.

As illustrated in FIG. 6, step S4 includes steps S41 to S43.

In step S41, electronic device 10 determines whether the security level is the first security level or the second security level. In step S41, in a case where the security level is the first security level, the processing proceeds to step S42. In a case where the security level is the second security level, the processing proceeds to step S43.

In step S42, electronic device 10 determinates the authentication using a password of the BIOS. Electronic device 10 searches for an authentication method corresponding to the first security level based on the authentication method information. In the present exemplary embodiment, since the authentication using a password of the BIOS is set for the first security level, electronic device 10 determines the authentication using a password of the BIOS.

"Authentication using a password of the BIOS" is an authentication method that enables use of electronic device 10 any number of times as long as the user inputs the set password, the password that can be set by the BIOS.

In step S43, electronic device 10 determinates the authentication using a one-time password. Electronic device 10 searches for an authentication method corresponding to the second security level based on the authentication method information. In the present exemplary embodiment, since the authentication using a one-time password valid only once is set for the second security level, electronic device 10 determines the authentication using a one-time password valid only once.

"Authentication using a one-time password" is an authentication method that enables use of electronic device 10 when a password valid only once is input. In the authentication using a one-time password, for example, when a correct password is input, electronic device 10 can be used only once, but even if the same password as the password of the first time is input for the second and subsequent times, electronic device 10 cannot be used.

As described above, in step S4, by performing steps S41 to S43, electronic device 10 determines the authentication method according to the security level.

Referring to FIG. 2, in step S5, electronic device 10 out puts a request for authentication according to the determined authentication method. Electronic device 10 displays, for example, a screen requesting authentication on the display of electronic device 10.

In a case of the request for the authentication using a password of the BIOS, electronic device 10 displays the screen display requesting the input of the password of the BIOS on the display. The user looks at the screen display of the display, and inputs the password of the BIOS to electronic device 10 through an input interface such as a keyboard.

In a case of the request for the authentication using a one-time password, electronic device 10 transmits the one-time password to external device 20, for example, while displaying the screen display requesting the input of the one-time password on the display. That is, electronic device 10 notifies external device 20 of the one-time password. External device 20 displays the one-time password to be input to electronic device 10. The user inputs the one-time password displayed on external device 20 to electronic device 10 through the input interface.

In step S6, electronic device 10 determines whether or not the input password is authenticated. In a case where the password is authenticated, that is, in a case where the correct password has been input, electronic device 10 starts the OS. In a case where the password is not authenticated, that is, in a case where an incorrect password has been input, the processing returns to step S5.

[Effects]

According to electronic device 10 of the first exemplary embodiment, the following effects can be obtained.

Electronic device 10 includes processor 11 and storage 12 that stores an instruction to be executed by processor 11 on the BIOS. The instruction includes steps S1 to S4. In step S1, electronic device 10 acquires position information indicating the position of electronic device 10. In step S2, electronic device 10 acquires the security setting information indicating the security setting determined according to the position of electronic device 10. In step S3, electronic device 10 determines the security level based on the position of electronic device 10 by using the position information and the security setting information. In step S4, electronic device 10 determines an authentication method that enables use of electronic device 10 according to the security level.

With such a configuration, since the authentication method can be determined according to the position of electronic device 10, security can be improved. For example, when being located at a relatively high security position, electronic device 10 determines an authentication method having a relatively low security level, and when being located at a relatively low security position, electronic device 10 determines an authentication method having a relatively high security level. In this way, since the authentication method can be changed according to the position of electronic device 10, security can be improved.

In addition, when electronic device 10 is located at a position, such as a workplace, where security is ensured, electronic device 10 can be used by a relatively simple authentication method. Therefore, in a case where electronic device 10 is used at a position where security is ensured, there is an effect that convenience of electronic device 10 is not deteriorated.

Step S4 of determining an authentication method includes determining at least one of the authentication using a password of the BIOS or the authentication using a one-time password valid only once. With such a configuration, by selectively using the authentication method that requires the input of the password according to the position of electronic device 10, security can be further improved without deterioration of convenience.

Electronic device 10 includes first communication unit 13 that communicates with external device 20 that acquires position information. Step S1 of acquiring the position information includes acquiring the position information from external device 20 by first communication unit 13. With such a configuration, based on the position information acquired by external device 20, the position information of electronic device 10 can be acquired. In addition, in a case where external device 20 is a device including the GPS with higher accuracy than position information detector 15 of electronic device 10, for example, a smartphone, electronic device 10 can acquire position information with higher accuracy.

Electronic device 10 includes position information detector 15 that acquires position information of electronic device 10. Step S1 of acquiring the position information includes acquiring the position information by position information detector 15. With such a configuration, electronic device 10 can acquire the position information by electronic device 10 alone without depending on external device 20. As a result, convenience can be improved.

The security setting information is stored in server 30 on the network. Electronic device 10 includes second communication unit 14 that communicates with server 30 via the network. The instruction includes steps S21 to S23 of acquiring the security setting information from server 30 by second communication unit 14. With such a configuration, electronic device 10 can acquire the security setting information from server 30. For example, in a case where the administrator sets, changes, or updates the security setting information stored in server 30, electronic device 10 can acquire the latest set, changed, or updated security setting information by communicating with server 30.

The security setting information includes the registered position indicating a position registered in advance and the first security level set for the registered position. Step S3 of determining the security level includes determining whether or not electronic device 10 is at the registered position, and determining the security level to be the first security level when electronic device 10 is at the registered position. With such a configuration, the authentication method can be changed according to the information on whether or not electronic device 10 is at the registered position. For example, in a case where the security of the registered position is relatively high, a relatively simple authentication method can be adopted by lowering the first security level. As a result, convenience can be improved.

In step S3 of determining the security level, if the security level is determined to be the first security level, step S4 of determining the authentication method includes determining the authentication using a password of the BIOS. With such a configuration, it is possible to further improve convenience by adopting relatively simple password authentication.

The security setting information includes the second security level set for the unregistered position other than the registered position. The second security level is higher than the first security level. Step S3 of determining the security level includes determining the security level to be the second security level in a case where electronic device 10 is not at the registered position. In a case where the security level is determined to be the second security level in step S3 of determining the security level, step S4 of determining an authentication method includes determining the authentication using a one-time password valid only once. With such a configuration, in a case where electronic device 10 is not at the registered position, it is possible to further improve security by adopting password authentication with relatively high security.

The instruction includes step S5 of outputting authentication according to the determined authentication method. With such a configuration, authentication such as input of a password can be requested to the user.

Also in the control method, the program, and the computer storage medium of electronic device 10, effects similar to the above effects can be obtained.

Note that, in the present exemplary embodiment, an example has been described in which electronic device 10 is a laptop PC, but the present invention is not limited thereto. For example, electronic device 10 may be a computer such as a desktop PC or a tablet PC.

In the present exemplary embodiment, an example has been described in which first communication unit 13 and second communication unit 14 are separate bodies, but the present invention is not limited thereto. For example, first communication unit 13 and second communication unit 14 may be integrally configured.

In the present exemplary embodiment, an example has been described in which external device 20 is a smartphone, but the present invention is not limited thereto. In addition, an example has been described in which external device 20 performs near field communication with electronic device 10, but the present invention is not limited thereto. For example, external device 20 only needs to be able to perform short-distance communication with electronic device 10, and may communicate with electronic device 10 by wired communication. For example, external device 20 may be a beacon. The beacon may be fixed to a specific place, for example, a conference room or the like. In this case, electronic device 10 may not include position information detector 15 such as the GPS. Electronic device 10 may detect that electronic device 10 is at a relatively high security position by communicating with the beacon.

In the present exemplary embodiment, an example has been described in which the sensor of external device 20 can detect the position with higher accuracy than position information detector 15 of electronic device 10, but the present invention is not limited thereto. For example, the sensor of external device 20 may have lower accuracy in position detection than position information detector 15 of electronic device 10. For example, electronic device 10 may use the position information with higher position detection accuracy out of the sensor of external device 20 and position information detector 15.

In the present exemplary embodiment, an example has been described in which step S1 of acquiring the position information includes acquiring the first position information from external device 20 and acquiring the second position information by position information detector 15 of electronic device 10, but the present invention is not limited thereto. For example, in step S1, the position information may be acquired from at least one of external device 20 or position information detector 15. For example, electronic device 10 may not include position information detector 15. In this case, electronic device 10 may acquire the first position information from external device 20 and may not acquire the second position information. Alternatively, electronic device 10 may not include first communication unit 13. In this case, electronic device 10 may acquire the second position information by position information detector 15, and may not acquire the first position information by communicating with external device 20.

In the present exemplary embodiment, an example has been described in which the position information of electronic device 10 is acquired by the GPS, but the present invention is not limited thereto. For example, the position information of electronic device 10 may be acquired from an IP address, a beacon, or the like. In this case, position information detector 15 may include a circuit that specifies the position from an IP address, a beacon, or the like.

In the present exemplary embodiment, an example has been described in which step S2 of acquiring the security setting information reads the security setting information stored in storage 12, but the present invention is not limited thereto. For example, in step S2, the security setting information may be directly acquired from server 30.

In the present exemplary embodiment, an example has been described in which the set, changed, or updated security setting information is acquired from server 30, but the present invention is not limited thereto. For example, the set, changed, or updated security setting information may be stored in a computer-readable storage medium. When being connected to a computer-readable storage medium, electronic device 10 may read the security setting information from the computer-readable storage medium and store the security setting information in storage 12. In this case, electronic device 10 may not communicate with server 30.

In the present exemplary embodiment, an example has been described in which the security setting information includes the registered position, the first security level set for the registered position, and the second security level set for the unregistered position, but the present invention is not limited thereto. For example, the security level may be set for each of a plurality of registered positions.

In the present exemplary embodiment, an example has been described in which a position where security is ensured is registered as the registered position, but the present invention is not limited thereto. For example, a position with relatively low security may be registered as the registered position. In this case, for a registered position with a relatively low security, a relatively high level of security level may be set. For example, the security level of the registered position may be set higher than the security level of the unregistered position.

For example, in a case where a specific place where security is not ensured is registered and electronic device 10 is in the specific place, a relatively high security level may be set. In this case, in a case where electronic device 10 is in the specific place, electronic device 10 may determine the authentication using a one-time password. In addition, in a case where electronic device 10 is not in the specific place, electronic device 10 may determine the authentication using the BIOS.

In the present exemplary embodiment, an example has been described in which the authentication method includes the authentication using a password of the BIOS, the authentication using a one-time password, or the authentication using a fingerprint, but the present invention is not limited thereto. The authentication method may include other authentication methods. For example, the authentication method may include biometric authentication such as retinal authentication and face authentication. In addition, the authentication may not be requested at a position where security is ensured. In this case, electronic device 10 may not output the screen display requesting authentication such as the input of a password. The user can use electronic device 10 without authentication.

In addition, for the second security level, both the authentication using a password of the BIOS and the authentication using a one-time password may be set.

In the present exemplary embodiment, an example has been described in which the one-time password is input through the input interface of electronic device 10, but the present invention is not limited thereto. For example, the one-time password may be input to external device 20. In this case, external device 20 may transmit the one-time password to electronic device 10 by wireless communication.

In the present exemplary embodiment, an example has been described in which the one-time password generated by electronic device 10 is transmitted to external device 20, but the present invention is not limited thereto. For example, both the BIOS of electronic device 10 and external device 20 may each generate a one-time password using a common key system for generating the one-time password using a common key. In addition, the one-time password may be generated by any method other than the common key system.

In the present exemplary embodiment, an example has been described in which the operation of electronic device 10, that is, the method for controlling electronic device 10 is executed on the BIOS, but the present invention is not limited thereto. For example, the method for controlling electronic device 10 may be executed on unified extensible firmware interface (UEFI). That is, processor 11 may execute the instruction on the BIOS or the UEFI.

<First Modification>

Figure 7:
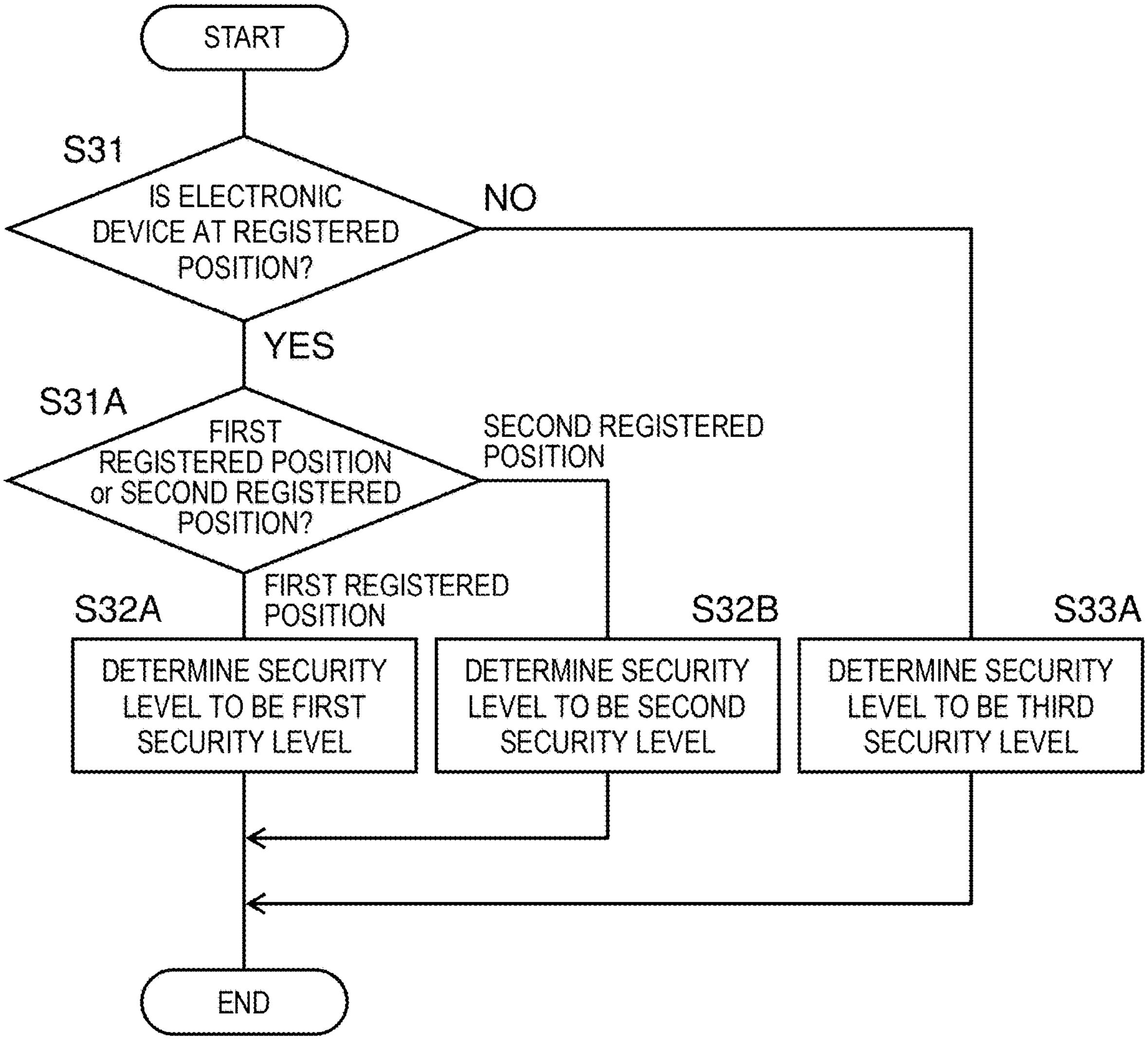
FIG. 7 is a flowchart of processing of determining a security level in a first modification.
Figure 8:
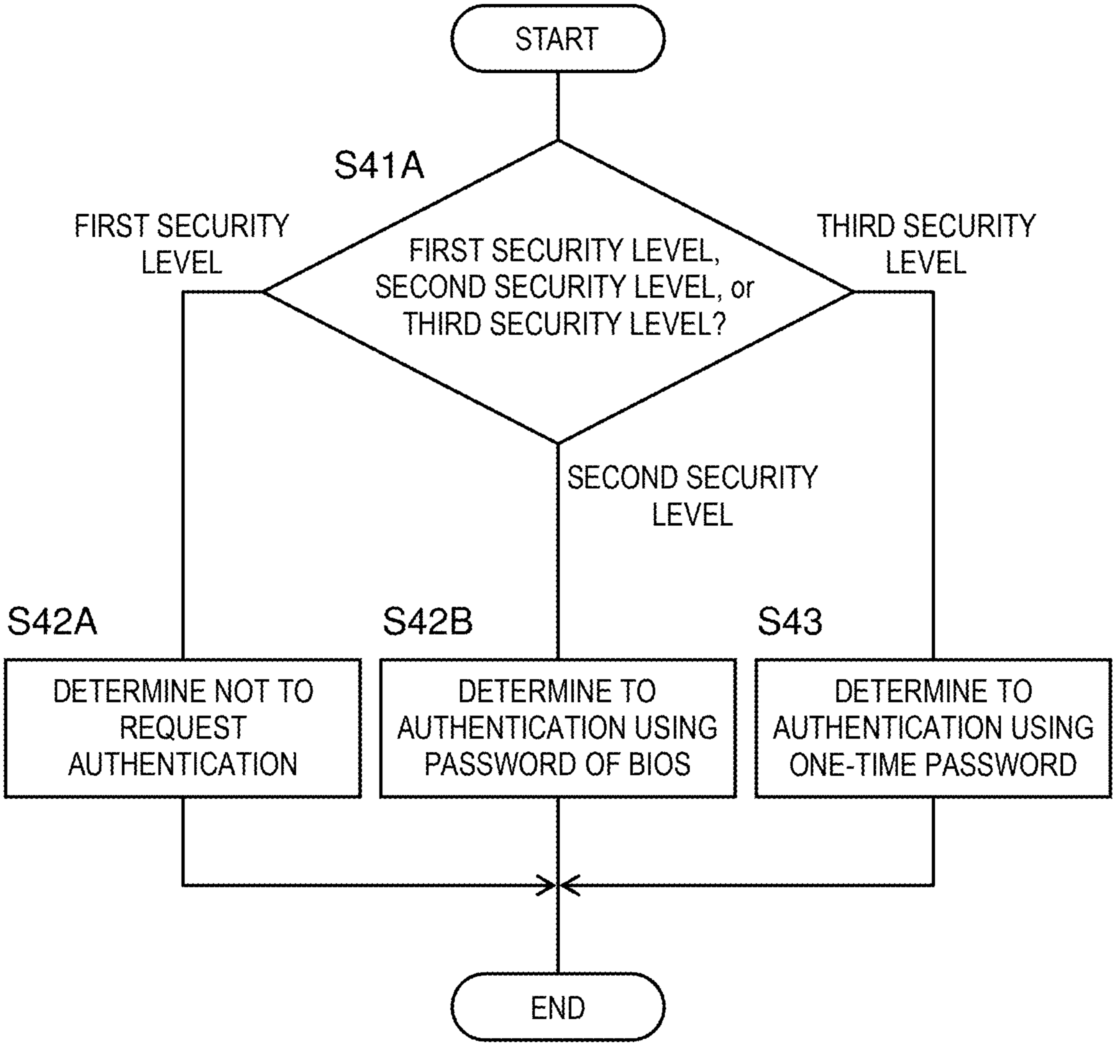
FIG. 8 is a flowchart of processing of determining an authentication method in the first modification.

FIG. 7 illustrates a flowchart of processing of determining a security level according to a first modification. FIG. 8 illustrates a flowchart of processing of determining an authentication method according to the first modification. As illustrated in FIG. 7 and FIG. 8, the first modification is different from the first exemplary embodiment in that different security levels are set for a plurality of registered positions and it is included that authentication is not requested. Note that, in the first modification, the description of the same processing as that of the first exemplary embodiment is omitted.

In the first modification, the security setting information includes the first security level set for a first registered position, the second security level set for a second registered position, and the third security level set for an unregistered position. The security level increases in the order of the first security level, the second security level, and the third security level. In addition, in the authentication method information, the first security level is set not to request authentication, the second security level is set to authentication using a password of the BIOS, and the third security level is set to authentication using a one-time password.

Step S3 for determining the security level in the first modification will be described with reference to FIG. 7.

As illustrated in FIG. 7, in step S31, it is determined whether or not electronic device 10 is at the registered position. In a case where it is determined in step S31 that electronic device 10 is at the registered position, the processing proceeds to step S31A. In a case where it is determined that electronic device 10 is not at the registered position, the processing proceeds to step S33A.

In step S31A, electronic device 10 determines whether electronic device 10 is at the first registered position or the second registered position. In a case where electronic device 10 is at the first registered position, the processing proceeds to step S32A. In a case where electronic device 10 is at the second registered position, the processing proceeds to step S32B.

In step S32A, electronic device 10 determines the security level to be the first security level set for the first registered position.

In step S32B, electronic device 10 determines the security level to be the second security level set for the second registered position.

In step S33A, electronic device 10 determines the security level to be the third security level set for the unregistered position.

Next, step S4 of determining the authentication method in the first modification will be described with reference to FIG. 8.

As illustrated in FIG. 8, in step S41A, electronic device 10 determines whether the security level is the first security level, the second security level, or the third security level. In a case where the security level is the first security level, the processing proceeds to step S42A. In a case where the security level is the second security level, the processing proceeds to step S42B. In a case where the security level is the third security level, the processing proceeds to step S43.

In step S42A, electronic device 10 determines not to request authentication.

In step S42A, electronic device 10 determinates the authentication using a password of the BIOS. Using the authentication method information, electronic device 10 determines the authentication using the password of the BIOS with reference to the authentication method set for the second security level.

In step S43, electronic device 10 determinates the authentication using a one-time password. Using the authentication method information, electronic device 10 determines the authentication using a one-time password with reference to the authentication method set for the third security level.

In steps S42A, S42B, and S43, using the authentication method information, electronic device 10 determines the authentication method with reference to the authentication method set for each security level.

With such a configuration, the authentication method can be individually determined for a plurality of registered positions. For example, in a case where the first registered position is a workplace and the second registered position is a home, the authentication method can be changed according to whether the position of electronic device 10 is at the workplace or at the home.

Second Exemplary Embodiment

An electronic device according to a second exemplary embodiment of the present disclosure will be described. The second exemplary embodiment will be described mainly on the points different from the first exemplary embodiment. In the description of the second exemplary embodiment, a configuration identical or equivalent to that of the first exemplary embodiment will be denoted by the same reference mark. In addition, the description already given for the first exemplary embodiment is omitted for the second exemplary embodiment.

Figure 9:
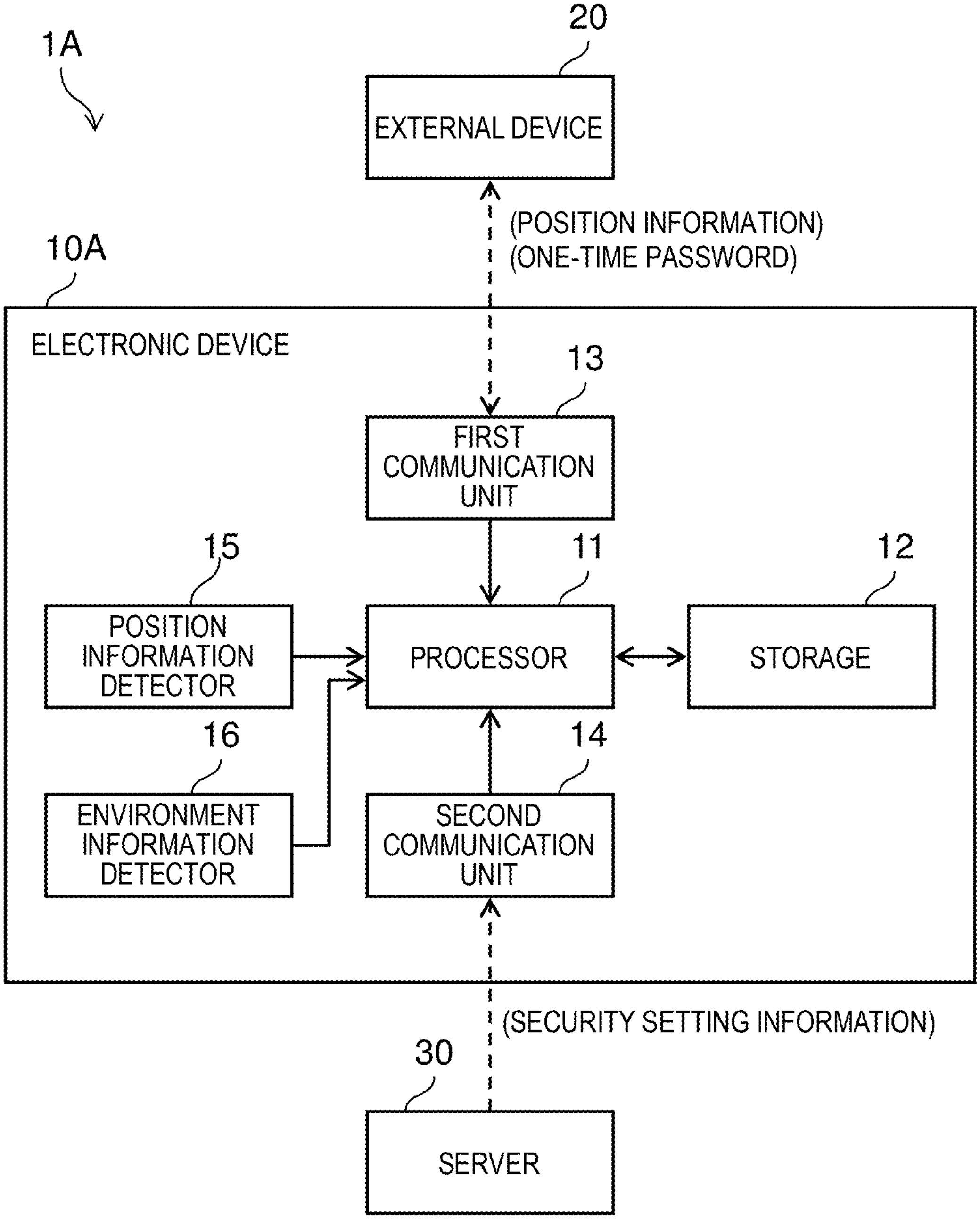
FIG. 9 is a schematic block diagram illustrating an example of a configuration of a control system including an electronic device according to a second exemplary embodiment of the present disclosure.
Figure 10:
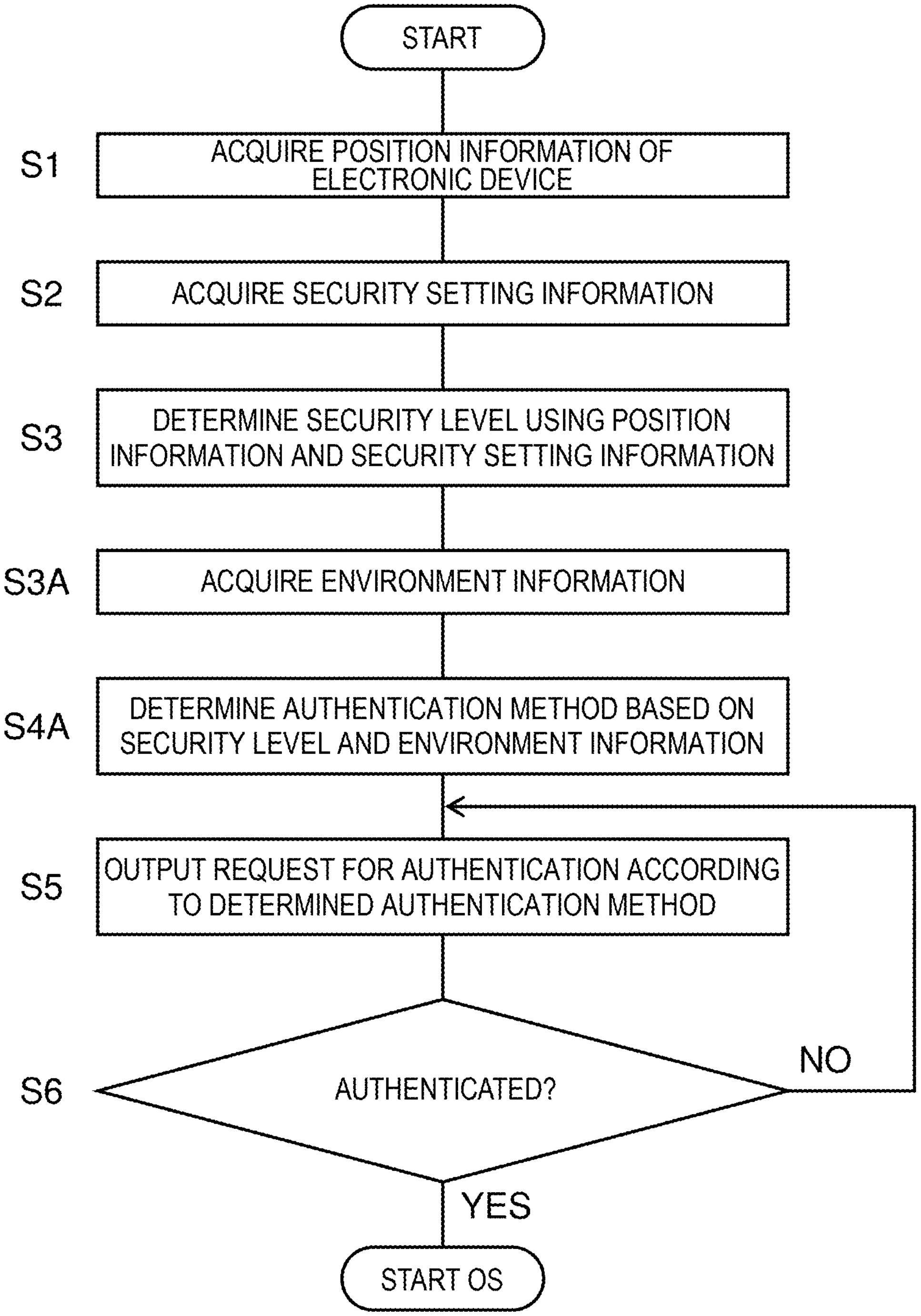
FIG. 10 is a control flowchart of an example of a method for controlling the electronic device according to the second exemplary embodiment of the present disclosure.
Figure 11:
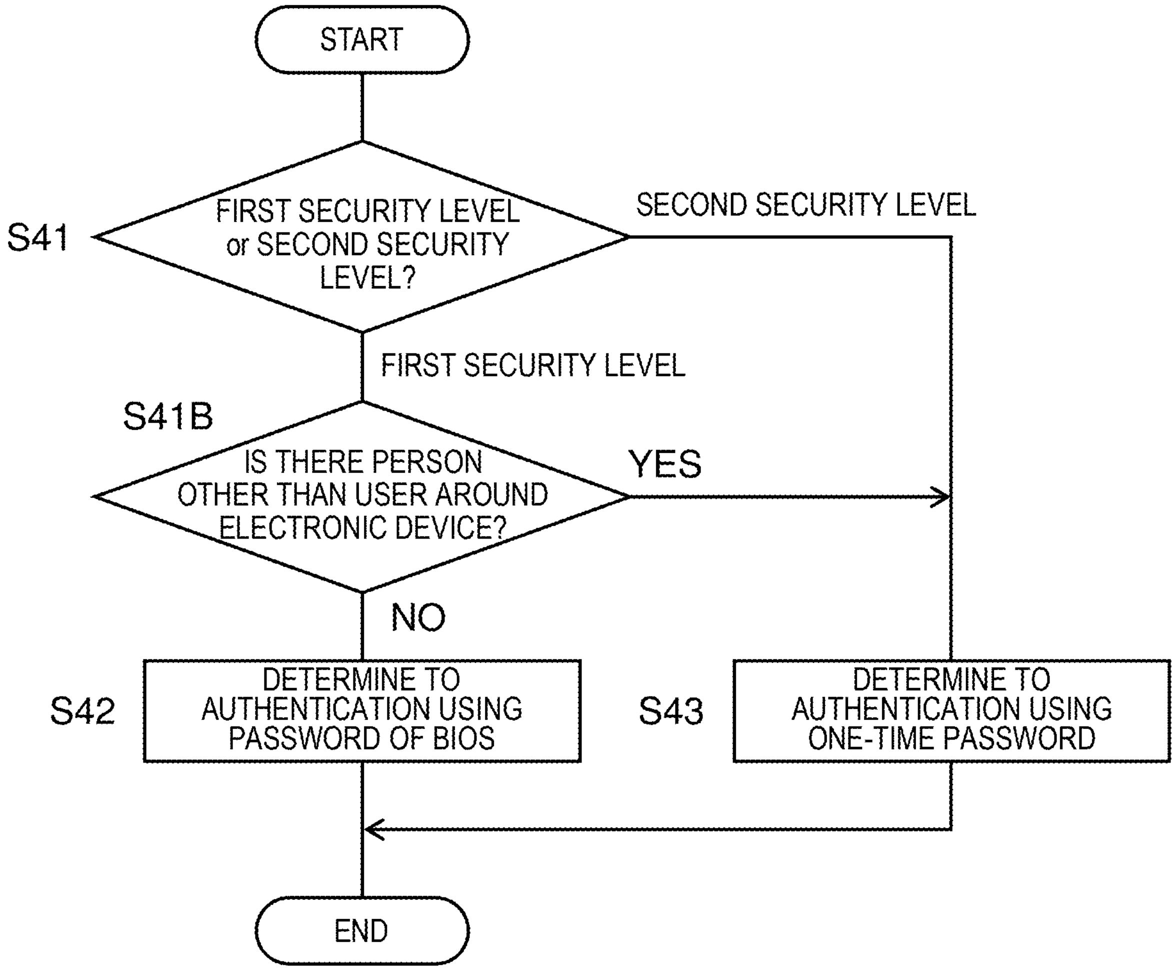
FIG. 11 is a flowchart of an example of processing of determining the authentication method.

An example of an electronic device according to the second exemplary embodiment will be described with reference to FIG. 9 to FIG. 11. FIG. 9 illustrates a schematic block diagram illustrating an example of a configuration of control system 1A according to the second exemplary embodiment of the present disclosure. FIG. 10 illustrates a control flowchart of an example of a method for controlling electronic device 10A according to the second exemplary embodiment of the present disclosure. FIG. 11 illustrates a flowchart of an example of processing of determining an authentication method.

The second exemplary embodiment is different from the first exemplary embodiment in that electronic device 10A includes environment information detector 16, and an authentication method is determined based on the environment information detected by environment information detector 16.

As illustrated in FIG. 9, electronic device 10A includes environment information detector 16.

Environment information detector 16 acquires environment information indicating environment around electronic device 10. The environment information includes, for example, sound or an image around electronic device 10. Environment information detector 16 is, for example, a microphone or a camera.

As illustrated in FIG. 10, the method for controlling electronic device 10A includes steps S1 to S6. Steps S1 to S3 and steps S5 to S6 in the second exemplary embodiment are similar to steps S1 to S3 and steps S5 to S6 in the first exemplary embodiment, and thus, detailed description thereof is omitted.

In step S1, electronic device 10A acquires position information of electronic device 10A.

In step S2, electronic device 10A acquires security setting information.

In step S3, electronic device 10A determines a security level using the position information and the security setting information.

In step S3A, electronic device 10A acquires environment information around electronic device 10A. Electronic device 10A acquires the environment information by environment information detector 16. In the present exemplary embodiment, environment information detector 16 is a microphone or a camera, and the environment information is sound or an image around electronic device 10A.

In step S4A, electronic device 10A determines an authentication method based on the security level and the environment information. As illustrated in FIG. 11, step S4A includes step S41B in addition to steps S41 to S43 of the first exemplary embodiment.

In step S41, electronic device 10A determines whether the security level is the first security level or the second security level. In a case where the security level is the first security level, the processing proceeds to step S41B. In a case where the security level is the second security level, the processing proceeds to step S43.

In step S41B, electronic device 10A determines whether or not there is a person other than the user around electronic device 10. Specifically, electronic device 10A determines whether or not there is a person other than the user around electronic device 10A based on the environment information acquired by environment information detector 16 in step S41B.

For example, in a case where the volume of the sound acquired by environment information detector 16 exceeds a predetermined threshold, electronic device 10A determines that there is a person other than the user around electronic device 10A. Alternatively, electronic device 10A detects whether or not a person other than the user appears in the image acquired by environment information detector 16. If the person other than the user is detected, electronic device 10A determines that there is a person other than the user around electronic device 10A.

Even in a case where electronic device 10A is used at the registered position where the security is relatively high, if it is determined that there is a person other than the user around electronic device 10A, electronic device 10A determines that the security is low to lower the security level.

In a case where it is determined in step S41B that there is a person other than the user around electronic device 10A, the processing proceeds to step S43. In a case where it is determined that there is no person other than the user around electronic device 10A, the processing proceeds to step S42.

In step S42, electronic device 10A determines the authentication using a password of the BIOS set for the first security level.

In step S43, electronic device 10A determines the authentication using a one-time password set for the second security level.

[Effects]

According to electronic device 10A of the second exemplary embodiment, the following effects can be obtained.

In electronic device 10A, the instruction executed on the BIOS further includes step S3A of acquiring the environment information indicating the environment around electronic device 10A. Step S4A of determining the authentication method includes determining the authentication method based on the environment information. With such a configuration, the authentication method can be determined in consideration of the environment around electronic device 10A. As a result, security can be further improved.

For example, even in a case where electronic device 10A is at the registered position with relatively high security, the security is deteriorated depending on the environment around electronic device 10A. Since electronic device 10A can change the authentication method based on the environment information, electronic device 10A can be used more safely.

The environment information includes information of sound or an image around the electronic device. Determining the authentication method based on the environment information includes determining whether or not there is a person other than the user around electronic device 10A based on sound or an image, and determining the authentication using a one-time password valid only once if it is determined that there is a person other than the user. With such a configuration, in a case where there is a third party other than the user around electronic device 10A, the authentication using a one-time password is performed, so that security can be improved.

Note that, in the present exemplary embodiment, an example has been described in which the environment information is sound or an image around electronic device 10A, but the present invention is not limited thereto. The environment information may be any information from which the environment around electronic device 10A can be recognized. For example, the environment information may be video, temperature, brightness, or the like around electronic device 10A.

In the present exemplary embodiment, an example has been described in which environment information detector 16 is a microphone or a camera, but the present invention is not limited thereto. For example, environment information detector 16 may be an infrared sensor, an illuminance sensor, a human sensor, or the like.

In the present exemplary embodiment, an example has been described in which, in a case where it is determined that there is no person around electronic device 10A, the authentication method is changed to the authentication using a one-time password, but the present invention is not limited thereto. For example, the authentication method may be changed to an authentication method with relatively high security other than the one-time password. In addition, in a case where it is determined that there is no person around electronic device 10A, the security level may be lowered and the authentication method may be changed to an authentication method with relatively low security.

Third Exemplary Embodiment

An electronic device according to a third exemplary embodiment of the present disclosure will be described. The third exemplary embodiment will be described mainly on the points different from the first exemplary embodiment. In the description of the third exemplary embodiment, a configuration identical or equivalent to that of the first exemplary embodiment will be denoted by the same reference mark. In addition, the description already given for the first exemplary embodiment is omitted for the third exemplary embodiment.

Figure 12:
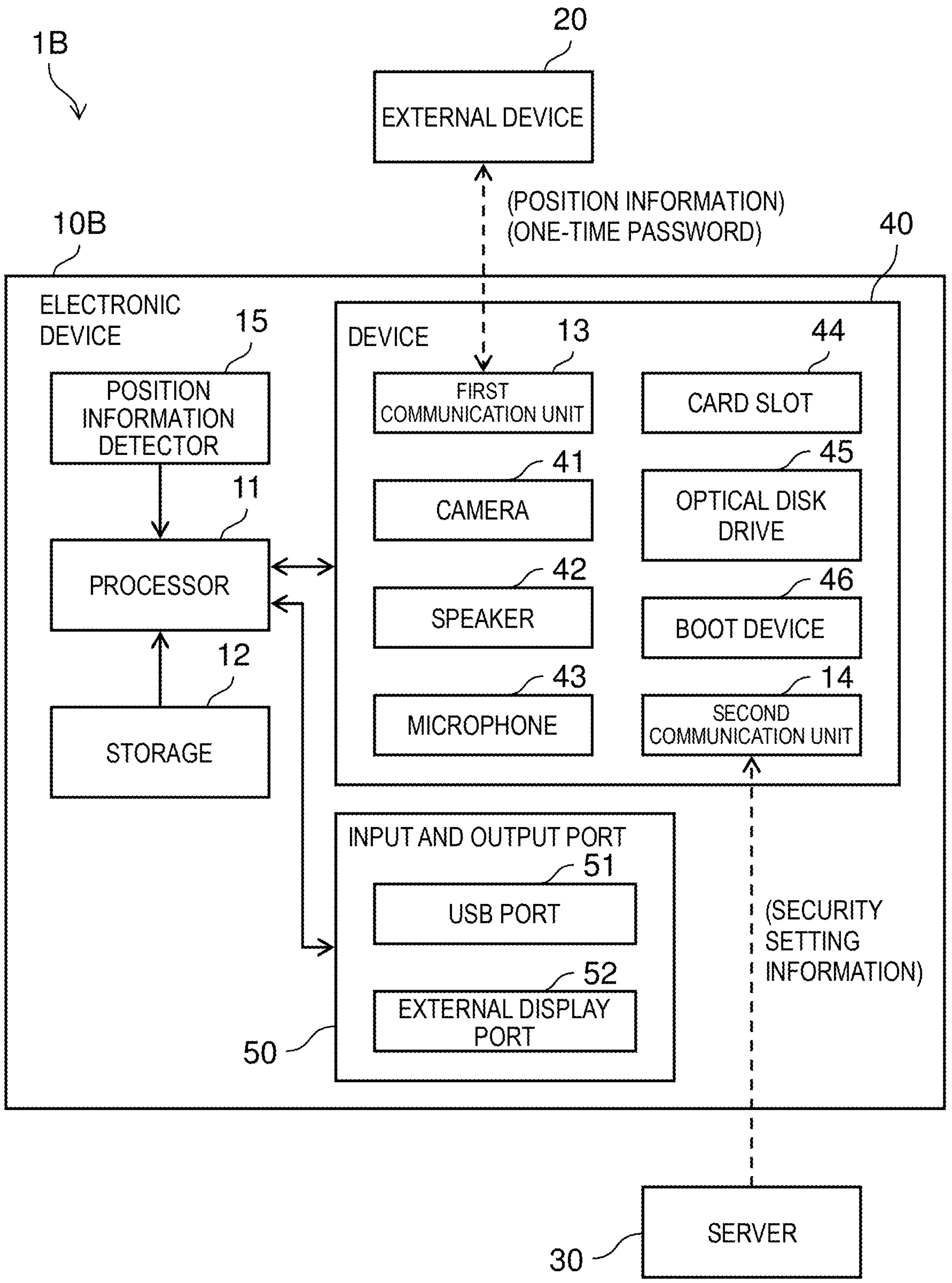
FIG. 12 is a schematic block diagram illustrating an example of a configuration of a control system including the electronic device according to a third exemplary embodiment of the present disclosure.
Figure 13:
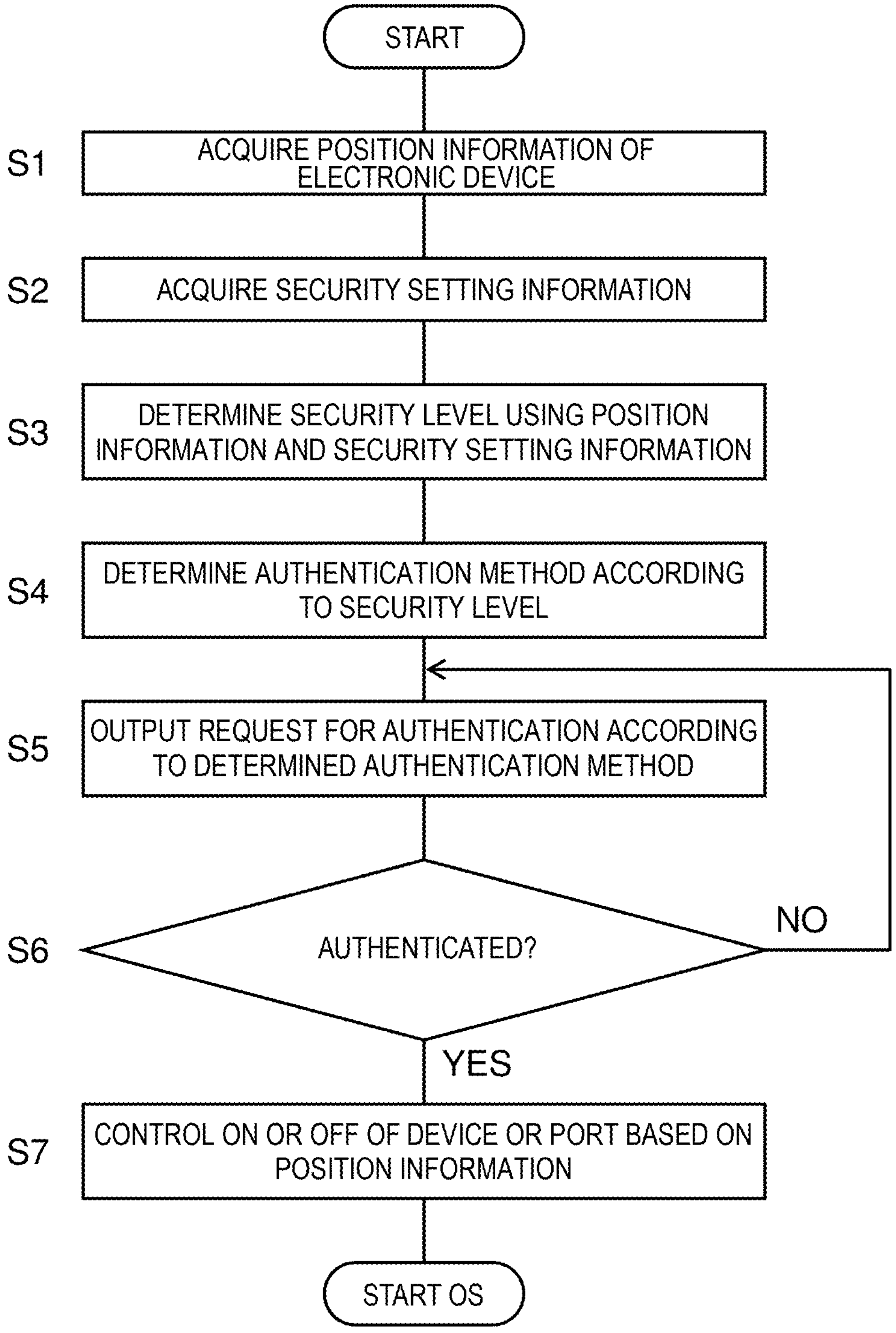
FIG. 13 is a control flowchart of an example of a method for controlling an electronic device according to the third exemplary embodiment of the present disclosure.
Figure 14:
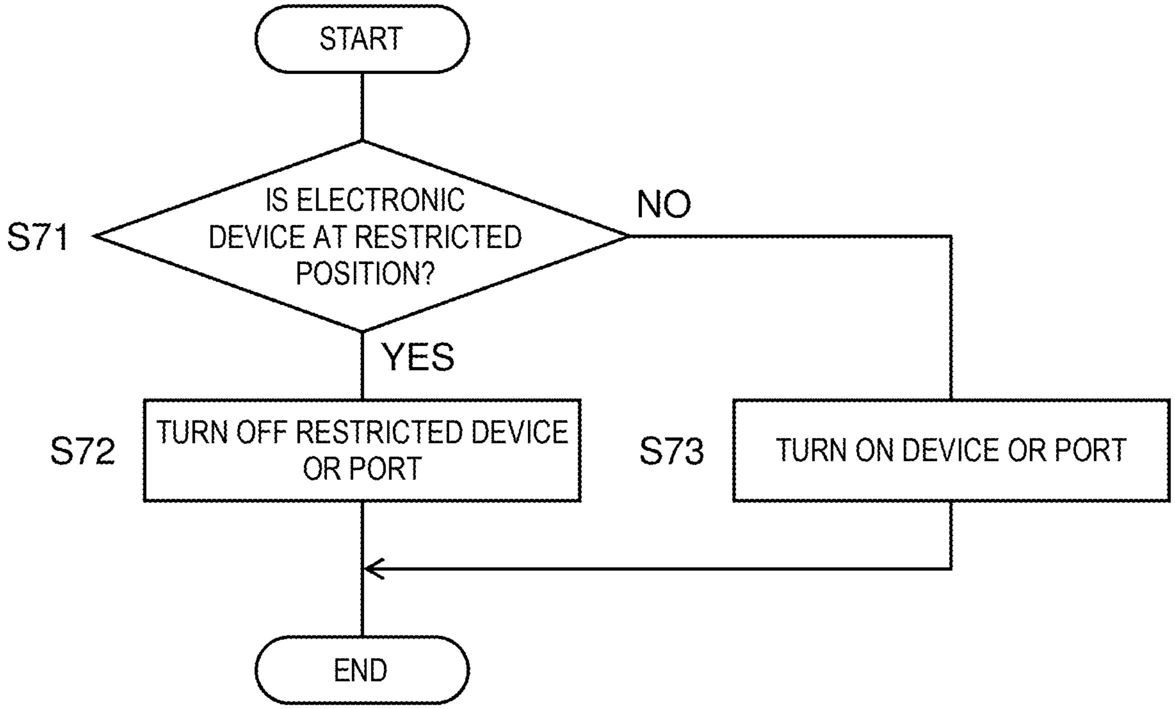
FIG. 14 is a flowchart of an example of processing of controlling on or off of a device or a port.

An example of an electronic device according to the third exemplary embodiment will be described with reference to FIG. 12 to FIG. 14. FIG. 12 illustrates a schematic block diagram illustrating an example of a configuration of control system 1B including electronic device 10B according to the third exemplary embodiment of the present disclosure. FIG. 13 illustrates a control flowchart of an example of a method for controlling electronic device 10B according to the third exemplary embodiment of the present disclosure. FIG. 14 illustrates a flowchart of an example of processing of controlling on or off of device 40 or port 50.

The third exemplary embodiment is different from the first exemplary embodiment in that on or off of device 40 or port 50 included in electronic device 10B is controlled according to the position of electronic device 10B.

As illustrated in FIG. 12, electronic device 10B includes a plurality of devices 40 and a plurality of ports 50. The plurality of devices 40 and the plurality of ports 50 can be controlled to be turned on or off on the BIOS by processor 11.

For example, the plurality of devices 40 includes first communication unit 13, second communication unit 14, camera 41, speaker 42, microphone 43, card slot 44, optical disk drive 45, boot device 46, and the like. Card slot 44 is, for example, an SD card slot. Boot device 46 is an HDD or an SSD in which an OS is stored.

For example, the plurality of ports 50 includes USB port 51 and external display port 52. External display port 52 is, for example, an HDMI (registered trademark) port.

Control information for controlling on or off of device 40 or port 50 according to the position is stored in storage 12 of electronic device 10B. For example, the control information includes a restricted position at which use of device 40 or port 50 is restricted, and on or off setting of device 40 or port 50 set with respect to the restricted position. The control information may be a table indicating the restricted position and on or off setting of device 40 or port 50 corresponding to the restricted position. The control information can be set, changed, or updated by an administrator. Similarly to the security setting information, the control information stored in storage 12 can be acquired from server 30 and set, changed, or updated. Note that, the control information may be included in the security setting information.

Next, an example of a method for controlling electronic device 10B will be described with reference to FIG. 13 and FIG. 14. Note that, steps S1 to S6 of the third exemplary embodiment are similar to steps S1 to S6 of the first exemplary embodiment, and thus, description thereof is omitted.

As illustrated in FIG. 13, in step S7, electronic device 10B controls on or off of device 40 or port 50 based on the position information. Electronic device 10B controls on or off of device 40 or port 50 based on the position information of electronic device 10B acquired in step S1 and the control information stored in storage 12.

As illustrated in FIG. 14, step S7 includes steps S71 to S73.

In step S71, it is determined whether or not electronic device 10B is at the restricted position. Electronic device 10B compares the position indicated by the position information with the restricted position registered in the control information to determine whether or not electronic device 10B is at the restricted position.

In a case where electronic device 10B is at the restricted position, the processing proceeds to step S72. In a case where electronic device 10B is not at the restricted position, the processing proceeds to step S73.

In step S72, electronic device 10B controls device 40 or port 50 to be turned on. In the present exemplary embodiment, since the restricted position is a relatively low security position, device 40 or port 50 is controlled to be turned off to become unavailable.

In step S73, electronic device 10B controls device 40 or port 50 to be turned on. In the present exemplary embodiment, device 40 or port 50 is controlled to be turned on to become available at positions other than the restricted position.

In steps S72 and S73, electronic device 10B controls on or off of device 40 or port 50 with reference to setting of on or off of device 40 or port 50 set for the restricted position using the control information.

In the present specification, "controlling on or off of device 40 or port 50" means controlling on or off of at least one device 40 or port 50 among the plurality of devices 40 or the plurality of ports 50.

For example, controlling device 40 to be turned off in a case where electronic device 10B is at the restricted position means controlling the device restricted by the control information among the plurality of devices 40 to be turned off, and other devices may be turned on.

[Effects]

According to electronic device 10B of the third exemplary embodiment, the following effects can be obtained.

Electronic device 10B includes device 40 or port 50 controlled by processor 11. The command includes step S7 of controlling on or off of device 40 or port 50 based on the position information indicating the position of electronic device 10B. With such a configuration, on or off of device 40 or port 50 can be controlled according to the position of electronic device 10B. As a result, security can be further improved.

Device 40 includes at least one of communication unit 13, communication unit 14, camera 41, speaker 42, microphone 43, card slot 44, optical disk drive 45, or boot device 46. Port 50 includes at least one of USB port 51 or external display port 52. With such a configuration, on or off of various devices or ports can be controlled according to the position of electronic device 10B.

For example, a case where a highly confidential area such as a laboratory or a specific conference room is registered as the restricted position in the control information will be described. In a case where electronic device 10B is in a highly confidential area or a specific conference room, electronic device 10B controls camera 41 or microphone 43 to be off. In addition, in a case where electronic device 10B leaves a highly confidential area or a specific conference room, electronic device 10B controls camera 41 or microphone 43 to be turned on. As a result, it is possible to prevent a document or an object disposed in a highly confidential area from appearing in camera 41 or a conversation in a specific conference room from being recorded through microphone 43.

For example, a case where an area where highly confidential work is performed is registered as a restricted position in the control information will be described. In a case where electronic device 10B is in the area where highly confidential work is performed, electronic device 10B controls speaker 42 to be turned off. In addition, in a case where electronic device 10B leaves the area where highly confidential work is performed, electronic device 10B controls speaker 42 to be turned on. As a result, it is possible to prevent voice from leaking from speaker 42 in the area where highly confidential work is performed.

For example, a case where a specific place is registered as a restricted position in the control information will be described. When electronic device 10B is in a specific place, electronic device 10B controls boot device 46 to be turned off. In addition, in a case where electronic device 10B is at a place other than the specific place, electronic device 10B controls boot device 46 to be turned on. As a result, since the OS cannot be activated at the specific place, user login and leakage of data in the storage can be prevented.

Alternatively, in a case where electronic device 10B is in the specific place, electronic device 10B controls optical disk drive 45 or USB port 51 to be turned off. In addition, in a case where electronic device 10B is at the place other than the specific place, electronic device 10B controls optical disk drive 45 or USB port 51 to be turned on. As a result, in the specific place, an external device such as optical disk drive 45 or a USB memory cannot be used as a boot device, so that initialization and leakage of data can be prevented.

Alternatively, in a case where electronic device 10B is in the specific place, electronic device 10B controls on or off of first communication unit 13 or second communication unit 14. For example, in a case where electronic device 10B is in the specific place such as a cafe, electronic device 10B controls the WWAN to be turned on and controls other communication functions other than the WWAN such as a wired LAN and a wireless LAN to be turned off in order to prohibit the use of FreeWi-Fi in the specific place. As a result, a communication packet can be protected from unauthorized information leakage devices. Note that, electronic device 10B may control to use either the eSIM or the nanoSIM when performing limited communication using the WWAN.

Alternatively, in a case where electronic device 10B is in the specific place, electronic device 10B controls card slot 44, optical disk drive 45, or USB port 51 to be turned off. As a result, it is possible to prevent information from being leaked from an external storage device by not using an external storage or the port at the specific place.

Note that, in the present exemplary embodiment, an example has been described in which electronic device 10B controls on or off of device 40 or port 50 according to the position information, but the present invention is not limited thereto. For example, electronic device 10B may control on or off of device 40 or port 50 according to the security level.

Fourth Exemplary Embodiment

An electronic device according to a fourth exemplary embodiment of the present disclosure will be described. The fourth exemplary embodiment will be described mainly on the points different from the first exemplary embodiment. In the description of the fourth exemplary embodiment, a configuration identical or equivalent to that of the first exemplary embodiment will be denoted by the same reference mark. In addition, the description already given for the first exemplary embodiment is omitted for the fourth exemplary embodiment.

Figure 15:
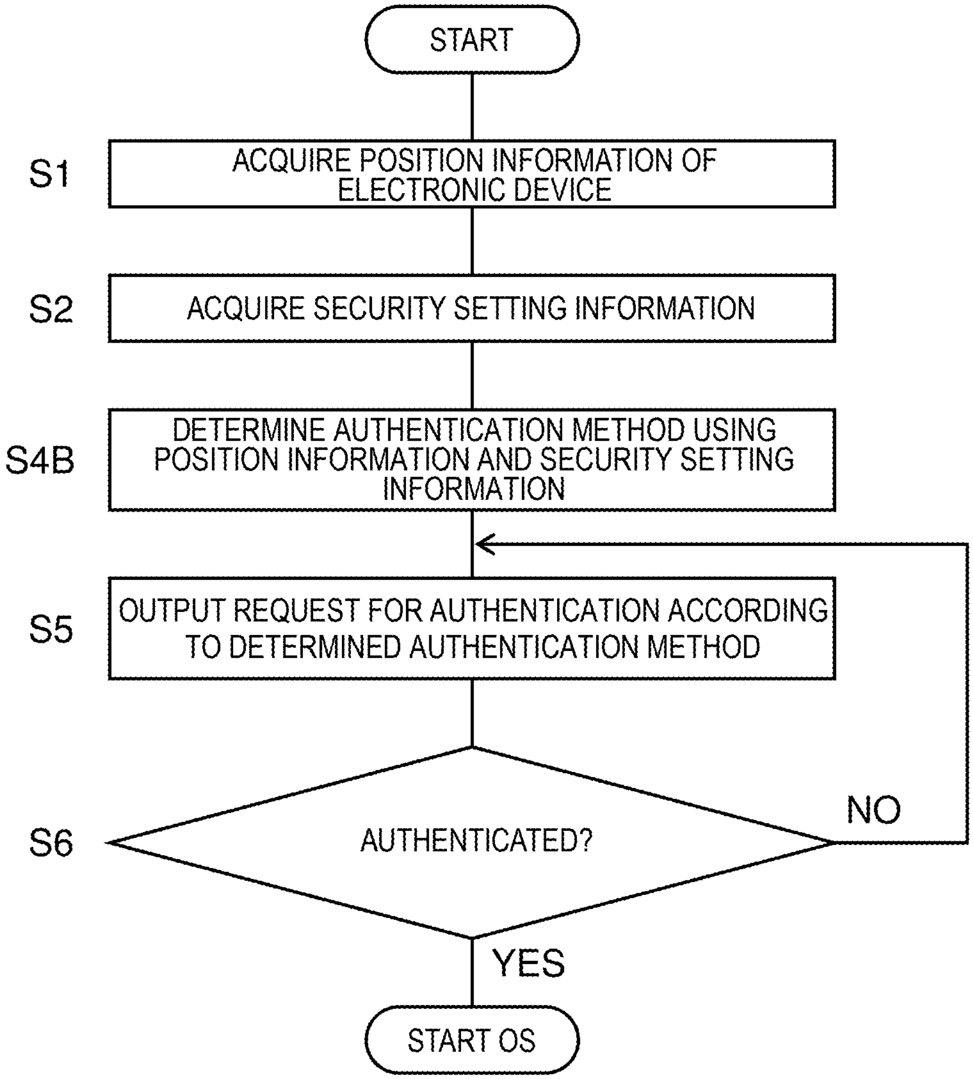
FIG. 15 is a control flowchart of an example of a method for controlling an electronic device according to a fourth exemplary embodiment of the present disclosure.

An example of a control of an electronic device according to the fourth exemplary embodiment will be described with reference to FIG. 15. FIG. 15 illustrates a control flowchart of an example of a method for controlling electronic device 10 according to the fourth exemplary embodiment of the present disclosure.

A fourth exemplary embodiment is different from the first exemplary embodiment in that electronic device 10 determines an authentication method based on position information of electronic device 10 without determining a security level.

As illustrated in FIG. 15, the method for controlling electronic device 10 includes steps S1 to S2 and steps S4B to S6. Steps S1 to S2 and steps S5 to S6 in the fourth exemplary embodiment are similar to steps S1 to S2 and steps S5 to S6 in the first exemplary embodiment, and therefore detailed description thereof is omitted.

In step S1, electronic device 10 acquires position information of electronic device 10.

In step S2, electronic device 10 acquires security setting information. In the present exemplary embodiment, the security setting information includes information on an authentication method set for the position of electronic device 10. For example, the security setting information includes a position of electronic device 10 and an authentication method preset for the position of electronic device 10.

For example, no authentication or the authentication method using a password of the BIOS may be set for a relatively high-security registered position. In addition, an authentication method using a one-time password may be set in addition to the registered position.

In step S4B, electronic device 10 determines an authentication method using the position information and the security setting information.

Since steps S5 to S6 are similar to those in the first exemplary embodiment, the description thereof is omitted.

[Effects]

According to electronic device 10 of the fourth exemplary embodiment, the following effects can be obtained.

In electronic device 10 according to the fourth exemplary embodiment, the security setting information includes the position of electronic device 10 and an authentication method preset according to the position of electronic device 10. Electronic device 10 according to the fourth exemplary embodiment determines the authentication method by using the position information and the security setting information of electronic device 10 without determining the security level.

With such a configuration, since the authentication method can be determined according to the position of electronic device 10, security can be improved.

The exemplary embodiments have been described above to exemplify the techniques disclosed in the present application. However, the technique according to the present disclosure is not limited to these exemplary embodiments, and is applicable to exemplary embodiments in which changes, replacements, additions, omissions, or the like are made as appropriate.

Although the present disclosure has been fully described with reference to a preferred exemplary embodiment and with reference to the accompanying drawings, various variations and modifications will become apparent to those skilled in the art. Such variations and modifications are to be understood as being included within the scope of the present disclosure as set forth in the appended claims, unless departing from the scope of the present disclosure.

In addition, these general and specific aspects of the present disclosure may be implemented by a system, a method, and a computer program, and combinations thereof.

Outlines of Exemplary Embodiment (1) An electronic device according to the present disclosure includes: a processor; and a storage that stores an instruction to be executed by the processor on a basic input output system (BIOS) or a unified extensible firmware interface (UEFI), and the instruction includes: acquiring position information indicating a position of an electronic device; acquiring security setting information indicating a security setting determined according to the position of the electronic device; determining a security level based on the position of the electronic device by using the position information and the security setting information; and determining an authentication method that enables use of the electronic device according to the security level.

(2) In the electronic device according to (1), determining the authentication method may include: not requesting authentication; and determining at least one of: the authentication using a password of the BIOS or the UEFI; or the authentication using a one-time password valid only once.

(3) The electronic device according to (1) or (2) may further include a first communication unit that communicates with an external device that acquires the position information, and acquiring the position information may include acquiring the position information from the external device by the first communication unit.

(4) The electronic device according to any one of (1) to (3) may further include a position information detector that acquires the position information of the electronic device, and acquiring the position information may include acquiring the position information by the position information detector.

(5) In the electronic device according to any one of (1) to (4), the security setting information may be stored in a server on a network, the electronic device may further include a second communication unit that communicates with the server via the network, and the instruction may include acquiring the security setting information from the server by the second communication unit.

(6) In the electronic device according to any one of (1) to (5), the security setting information may include a registered position indicating a position registered in advance and a first security level set for the registered position, and determining the security level may include: determining whether or not the electronic device is at the registered position; and determining the security level to be the first security level when the electronic device is at the registered position.

(7) In the electronic device according to (6), when determining the security level to be the first security level, determining the authentication method may include determining the authentication using a one-time password valid only once.

(8) In the electronic device according to (6), when determining the security level to be the first security level, determining the authentication method may include determining: that the authentication is not required; or the authentication using a password of the BIOS or the UEFI.

(9) In the electronic device according to any one of (6) to (8), the security setting information may further include a second security level set for a position other than the registered position, the second security level may be higher than the first security level, determining the security level may include: determining the security level to be the second security level when the electronic device is not at the registered position; and when determining the security level to be the second security level, determining the authentication method may include determining authentication using a one-time password valid only once.

(10) In the electronic device according to any one of (1) to (9), the instruction may further include acquiring environment information indicating environment around the electronic device, and determining the authentication method may include determining the authentication method based on the environment information.

(11) In the electronic device according to (10), the environment information may include information of sound or an image around the electronic device, and determining the authentication method based on the environment information may include: determining whether or not there is a person other than a user around the electronic device based on the sound or the image; and determining authentication using a one-time password valid only once when it is determined that there is a person other than the user.

(12) In the electronic device according to any one of (1) to (11), the instruction may further include outputting a request for authentication according to the determined authentication method.

(13) The electronic device according to any one of (1) to (11), may further include a device or a port controlled by the processor, and the instruction may further include controlling on or off of the device or the port based on the position information.

(14) In the electronic device according to (13), the device may include at least one of a communication unit, a camera, a speaker, a microphone, a card slot, an optical disk drive, or a boot device, and the port may include at least one of a USB port or an external display port.

(15) A method for controlling an electronic device according to the present disclosure is the method for controlling the electronic device executed on a basic input output system (BIOS) or a unified extensible firmware interface (UEFI), the method includes: acquiring position information indicating a position of the electronic device; acquiring security setting information indicating a security setting determined according to the position of the electronic device; determining a security level based on the position of the electronic device by using the position information and the security setting information; and determining an authentication method that enables use of the electronic device according to the security level.

(16) A program according to the present disclosure executes the control method according to (15).

(17) A computer-readable storage medium according to the present disclosure stores the program according to (16).

(18) An electronic device of the present disclosure includes: a processor; and a storage that stores an instruction to be executed by the processor on a basic input output system (BIOS) or a unified extensible firmware interface (UEFI), and the instruction includes:

acquiring position information indicating a position of an electronic device; acquiring security setting information indicating a security setting determined according to the position of the electronic device; and determining an authentication method that enables use of the electronic device by using the position information and the security setting information.

INDUSTRIAL APPLICABILITY

The present disclosure can be applied to an electronic device that determines an authentication method of the electronic device according to a position of the electronic device.

REFERENCE MARKS IN THE DRAWINGS

1, 1A, 1B: control system
10, 10B: electronic device
11: processor
12: storage
13: first communication unit
14: second communication unit
15: position information detector
16: environment information detector
20: external device
30: server
40: device
41: camera
42: speaker
43: microphone
44: card slot
45: optical disk drive
46: boot device
50: port
51: USB port
52: external display port

The invention claimed is:

1. An electronic device comprising:
a processor; and
a storage that stores an instruction to be executed by the processor on a basic input output system (BIOS) or a unified extensible firmware interface (UEFI),
wherein the instruction includes:
acquiring position information indicating a position of an electronic device;
acquiring security setting information indicating a security setting determined according to the position of the electronic device;
determining a security level based on the position of the electronic device by using the position information and the security setting information; and
determining an authentication method that enables use of the electronic device according to the security level,
wherein when determining the security level to be the first security level, determining the authentication method includes determining the authentication using a password of the BIOS or the UEFI.

2. The electronic device according to claim 1, wherein determining the authentication method includes:
not requesting authentication; and
determining at least one of:
the authentication using a password of the BIOS or the UEFI; or
the authentication using a one-time password valid only once.

3. The electronic device according to claim 1, further comprising a first communication unit that communicates with an external device that acquires the position information,
wherein acquiring the position information includes acquiring the position information from the external device by the first communication unit.

4. The electronic device according to claim 1, further comprising a position information detector that acquires the position information of the electronic device, wherein acquiring the position information includes acquiring the position information by the position information detector.

5. The electronic device according to claim 1, wherein the security setting information is stored in a server on a network, the electronic device further comprises a second communication unit that communicates with the server via the network, and the instruction includes acquiring the security setting information from the server by the second communication unit.

6. The electronic device according to claim 1, wherein the security setting information includes a registered position indicating a position registered in advance and a first security level set for the registered position, and determining the security level includes:

determining whether or not the electronic device is at the registered position; and determining the security level to be the first security level when the electronic device is at the registered position.

7. The electronic device according to claim 6, wherein the security setting information further includes a second security level set for a position other than the registered position, the second security level is higher than the first security level, determining the security level includes determining the security level to be the second security level when the electronic device is not at the registered position; and when determining the security level to be the second security level, determining the authentication method includes determining authentication using a one-time password valid only once.

8. The electronic device according to claim 1, wherein when determining the security level to be the first security level, determining the authentication method further includes determining the authentication using a one-time password valid only once.

9. The electronic device according to claim 1, wherein the instruction further includes acquiring environment information indicating environment around the electronic device, and determining the authentication method includes determining the authentication method based on the environment information.

10. The electronic device according to claim 9, wherein the environment information includes information of sound or an image around the electronic device, and determining the authentication method based on the environment information includes:

determining whether or not a person other than a user exists around the electronic device based on the sound or the image; and determining authentication using a one-time password valid only once when a person other than the user is determined to exist.

11. The electronic device according to claim 1, wherein the instruction further includes outputting a request for authentication according to the determined authentication method.

12. The electronic device according to claim 1, further comprising a device or a port controlled by the processor, wherein the instruction further includes controlling on or off of the device or the port based on the position information.

13. The electronic device according to claim 12, wherein the device includes at least one of a communication unit, a camera, a speaker, a microphone, a card slot, an optical disk drive, or a boot device, and the port includes at least one of a USB port or an external display port.

14. A method for controlling an electronic device executed on a basic input output system (BIOS) or a unified extensible firmware interface (UEFI), the method comprising:

acquiring position information indicating a position of the electronic device;

acquiring security setting information indicating a security setting determined according to the position of the electronic device;

determining a security level based on the position of the electronic device by using the position information and the security setting information; and determining an authentication method that enables use of the electronic device according to the security level, wherein when determining the security level to be a first security level, determining the authentication method includes determining the authentication using a password of the BIOS or the UEFI.

15. A non-transitory computer-readable storage medium having stored therein a program that, when executed in a processor, causes the processor to perform the method of claim 14.

16. An electronic device comprising:

a processor; and a storage that stores an instruction to be executed by the processor on a basic input output system (BIOS) or a unified extensible firmware interface (UEFI), wherein the instruction includes:

acquiring position information indicating a position of an electronic device;

acquiring security setting information indicating a security setting determined according to the position of the electronic device; and determining an authentication method that enables use of the electronic device by using the position information and the security setting information, wherein determining the authentication method includes determining the authentication using a password of the BIOS or the UEFI.

* * * * *